United States Patent
Hann et al.

(10) Patent No.: US 10,690,564 B2
(45) Date of Patent: Jun. 23, 2020

(54) CONTAINER LEAK DETECTION

(71) Applicant: ISHIDA EUROPE LIMITED, Birmingham, West Midlands (GB)

(72) Inventors: David Hann, Poole (GB); Graham Neale, Bournemouth (GB); Lee Graham Johnson, Nr Codsall (GB); Lee Vine, Lytchett Matravers (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 0 days.

(21) Appl. No.: 16/098,830

(22) PCT Filed: May 5, 2017

(86) PCT No.: PCT/GB2017/051255
§ 371 (c)(1),
(2) Date: Nov. 2, 2018

(87) PCT Pub. No.: WO2017/191465
PCT Pub. Date: Nov. 9, 2017

(65) Prior Publication Data
US 2019/0178745 A1    Jun. 13, 2019

(30) Foreign Application Priority Data
May 6, 2016    (GB) .................................. 1607941.0

(51) Int. Cl.
*G01M 3/22*    (2006.01)
*B07C 5/34*    (2006.01)

(52) U.S. Cl.
CPC .......... *G01M 3/227* (2013.01); *B07C 5/3404* (2013.01)

(58) Field of Classification Search
None
See application file for complete search history.

(56) References Cited

U.S. PATENT DOCUMENTS

| 4,841,763 A | 6/1989 | Kang et al. |
| 5,528,925 A | 6/1996 | Sherepa et al. |
| (Continued) |

FOREIGN PATENT DOCUMENTS

| DE | 102 40 295 A1 | 4/2004 |
| DE | 10 2013 000 086 A1 | 7/2014 |
| (Continued) |

OTHER PUBLICATIONS

Search Report dated Jun. 10, 2016, in United Kingdom Patent Application No. GB1607941.0, 5 pages.

(Continued)

*Primary Examiner* — Paul M. West
*Assistant Examiner* — Mark A Shabman
(74) *Attorney, Agent, or Firm* — Squire Patton Boggs (US) LLP

(57) ABSTRACT

There is provided a leak detection system for detecting breaches in sealed food containers. The leak detection system comprises air-sample testing equipment configured to test the composition of an air sample provided to the air-sample testing equipment. At least one pressing member is provided configured to, in use, apply pressure to the sealed food container located in an air-sampling region. At least one air-sampling port is located in the air-sampling region. An air sample conduit is provided extending between the at least one air-sampling port and the air-sample testing equipment. In use, the at least one air-sampling port takes an air sample from the air-sampling region at least during or after the at least one pressing member applies pressure to the sealed food container in the air-sampling region and communicates said air sample through the air sample conduit to the air-sample testing equipment.

15 Claims, 18 Drawing Sheets

(56) References Cited

U.S. PATENT DOCUMENTS

| | | | | |
|---|---|---|---|---|
| 5,786,530 A | * | 7/1998 | Fenlon | G01M 3/36 |
| | | | | 73/49.3 |
| 6,105,419 A | * | 8/2000 | Michels | G01M 3/329 |
| | | | | 73/41 |
| 2003/0106362 A1 | | 6/2003 | Megerle et al. | |
| 2013/0318917 A1 | * | 12/2013 | Nilsson | G01M 3/22 |
| | | | | 53/267 |

FOREIGN PATENT DOCUMENTS

| | | |
|---|---|---|
| EP | 2 755 015 A1 | 7/2014 |
| GB | 2493009 A | 1/2013 |
| JP | H07-37912 B2 | 4/1995 |
| JP | H07-187152 A | 7/1995 |
| JP | 2002-107261 A | 4/2002 |
| JP | 2003-106930 A | 4/2003 |
| JP | 2004-257917 A | 9/2004 |
| JP | 2007-108101 A | 4/2007 |
| JP | 2014-215070 A | 11/2014 |
| WO | WO 03/087787 A1 | 10/2003 |

OTHER PUBLICATIONS

International Search Report and Written Opinion dated Nov. 17, 2017, in International Patent Application No. PCT/GB2017/051255, 24 pages.

* cited by examiner

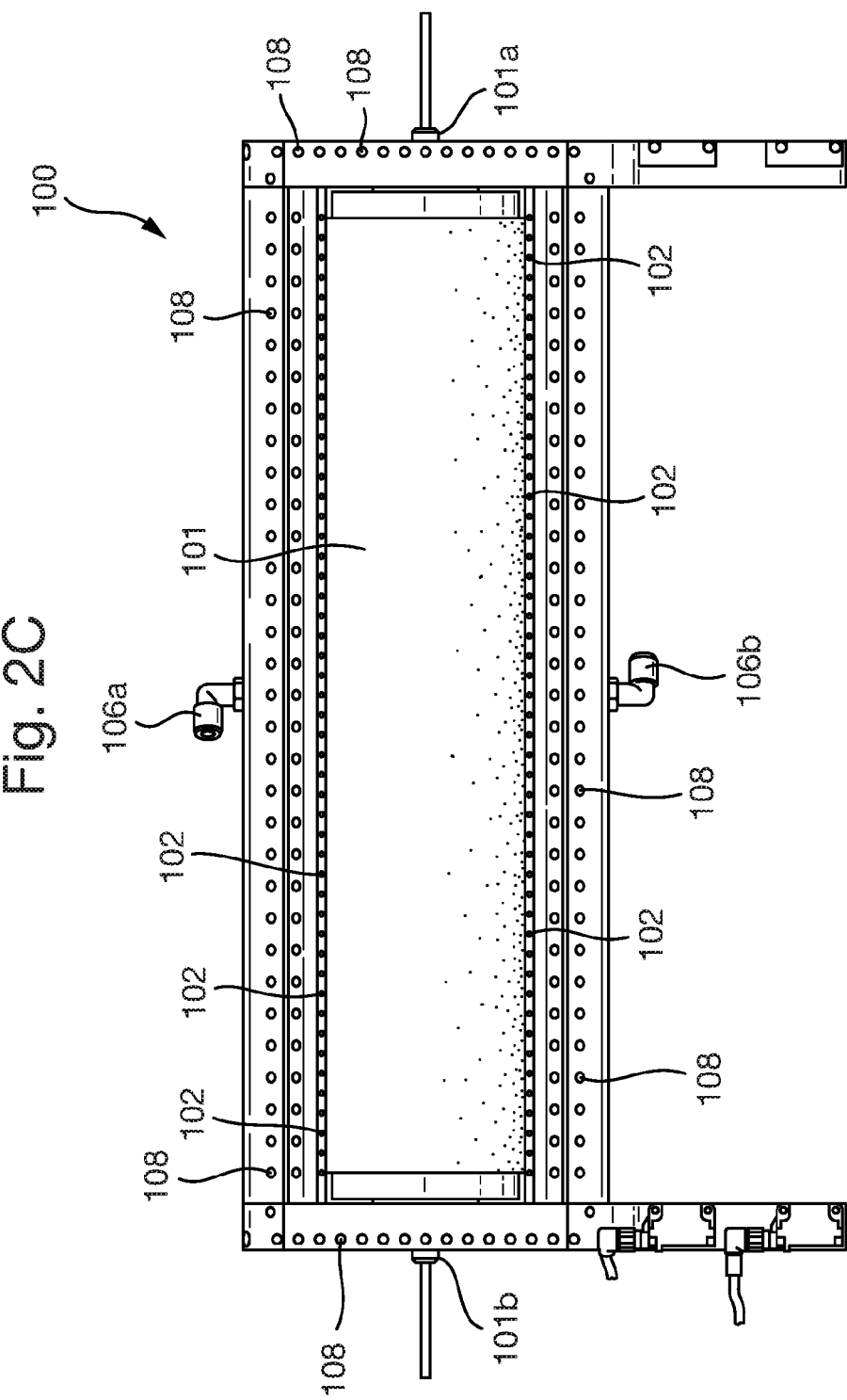

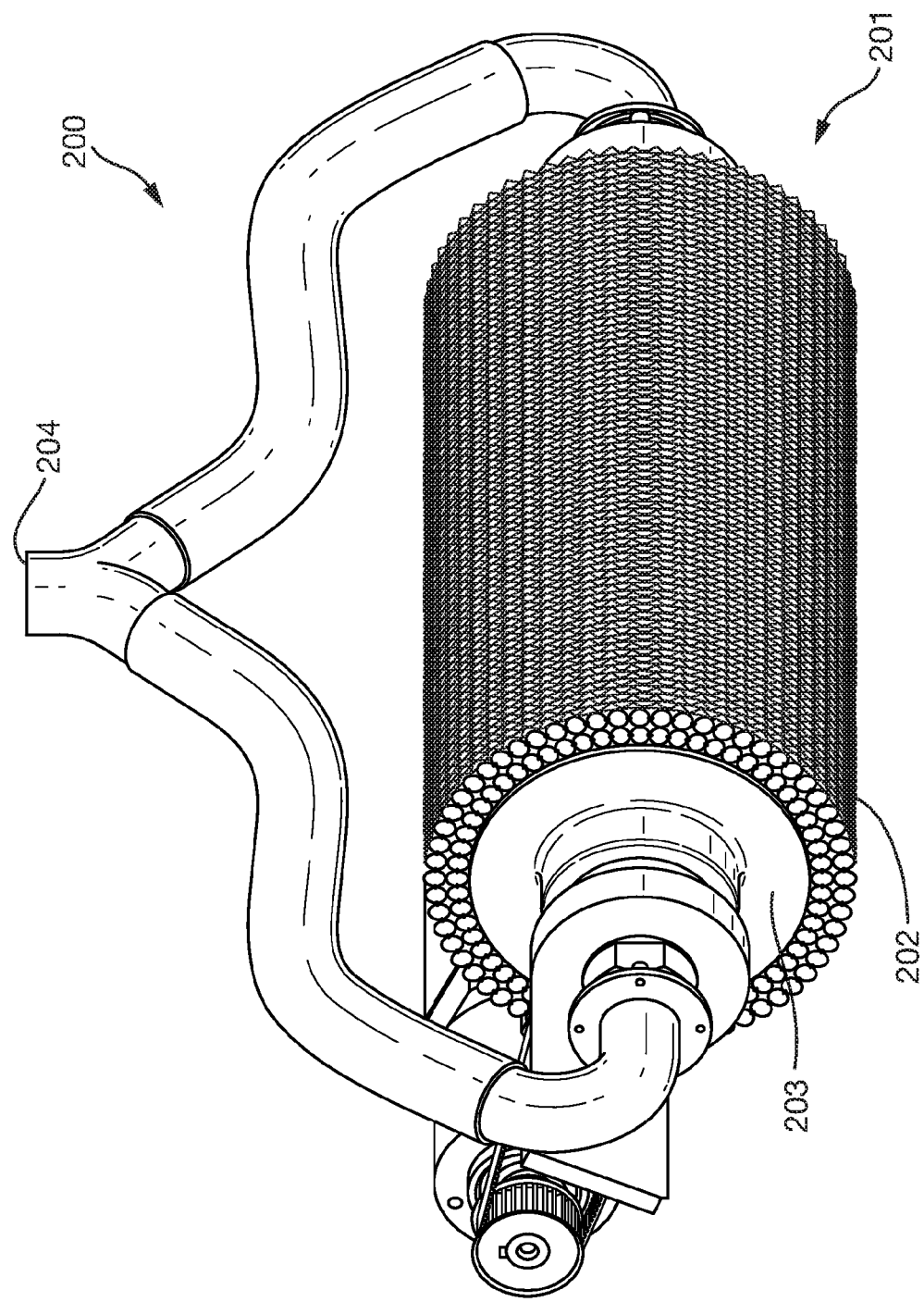

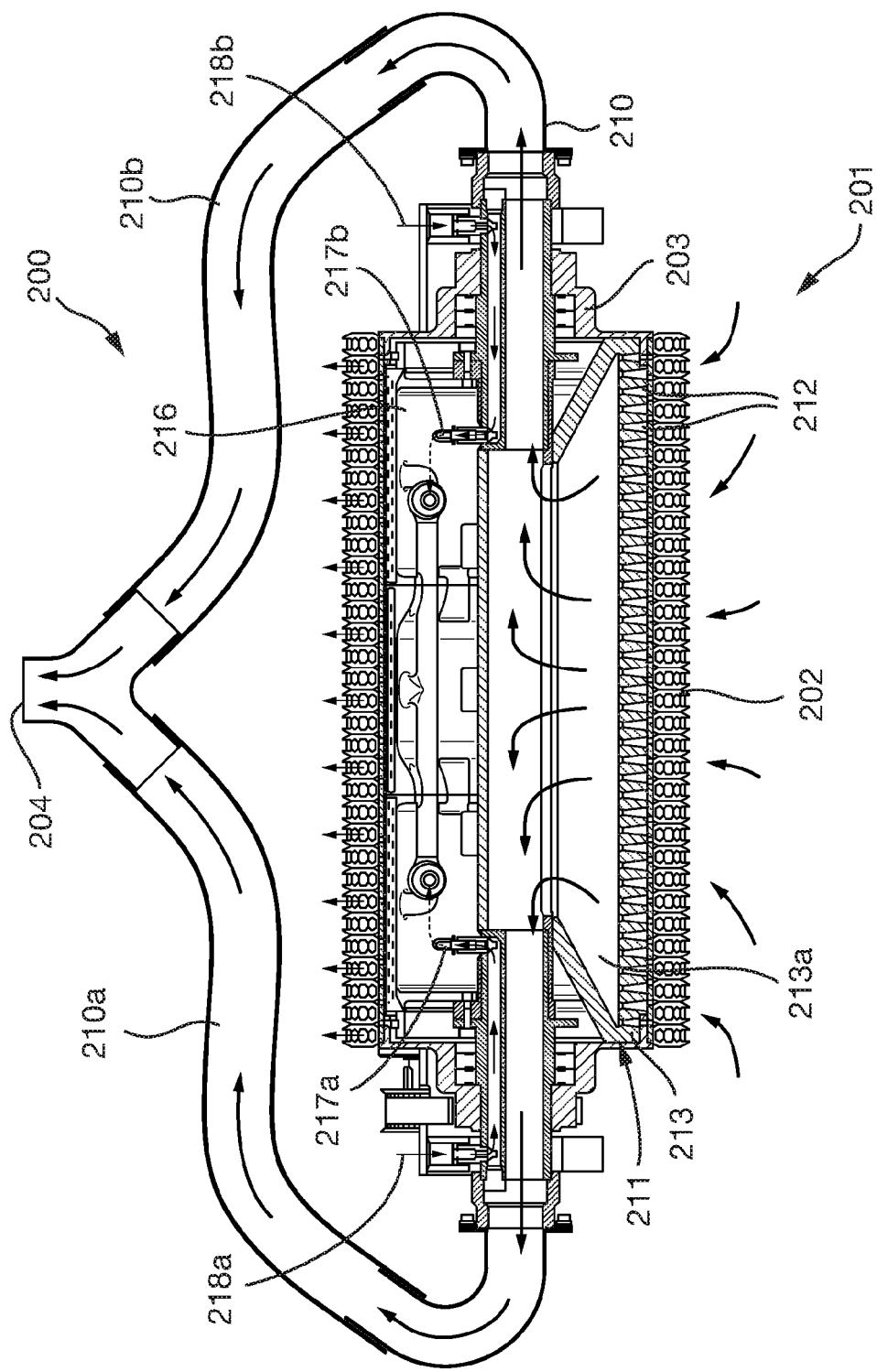

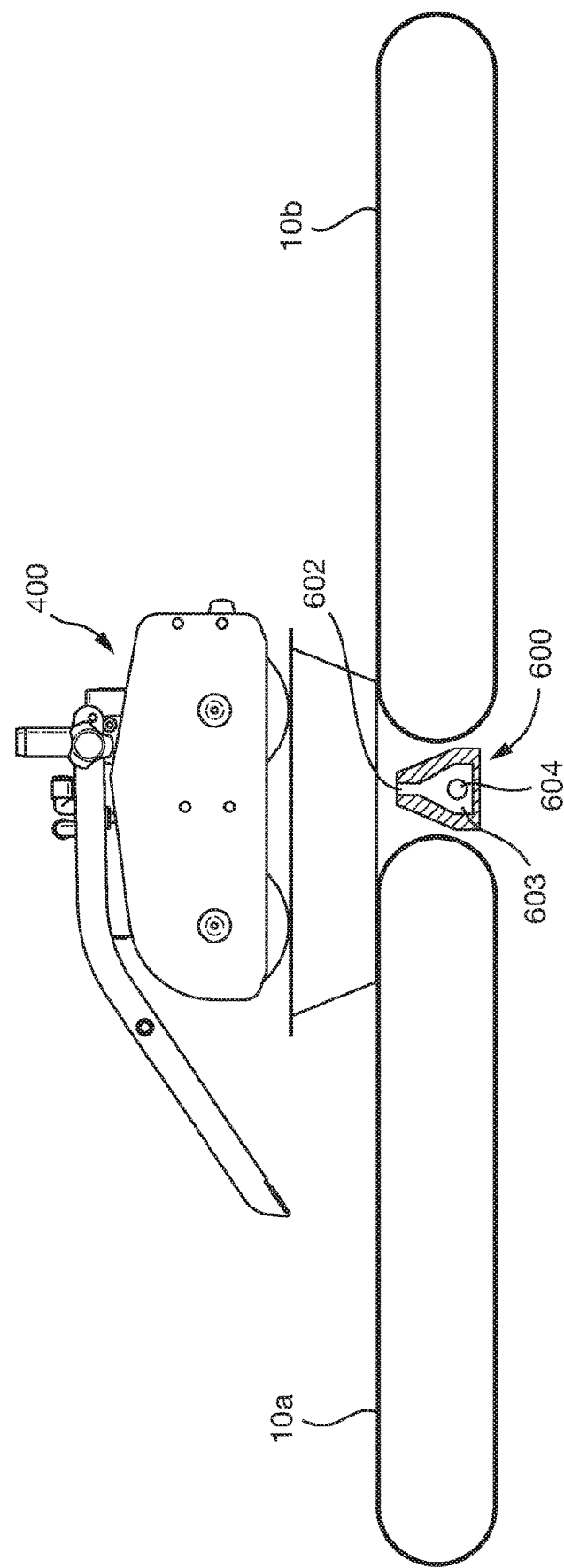

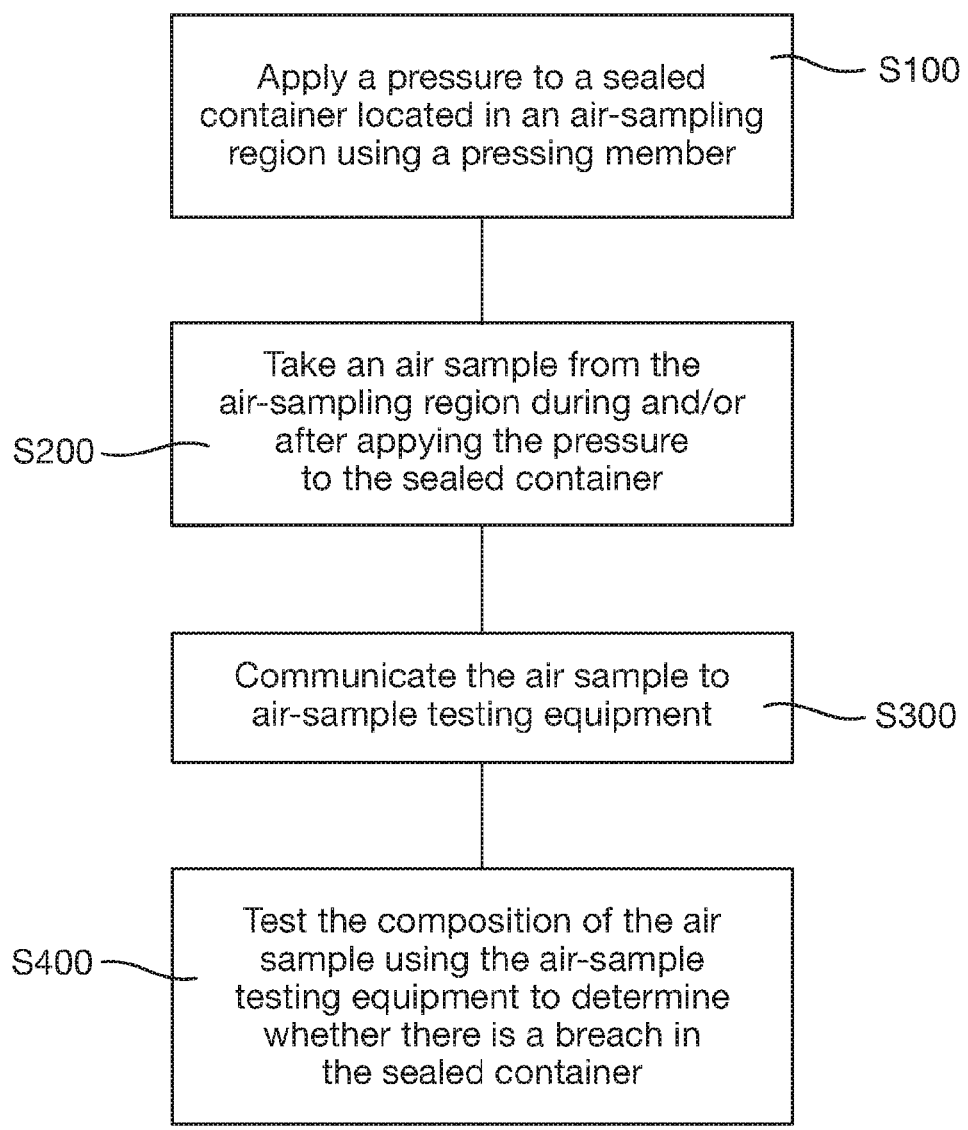

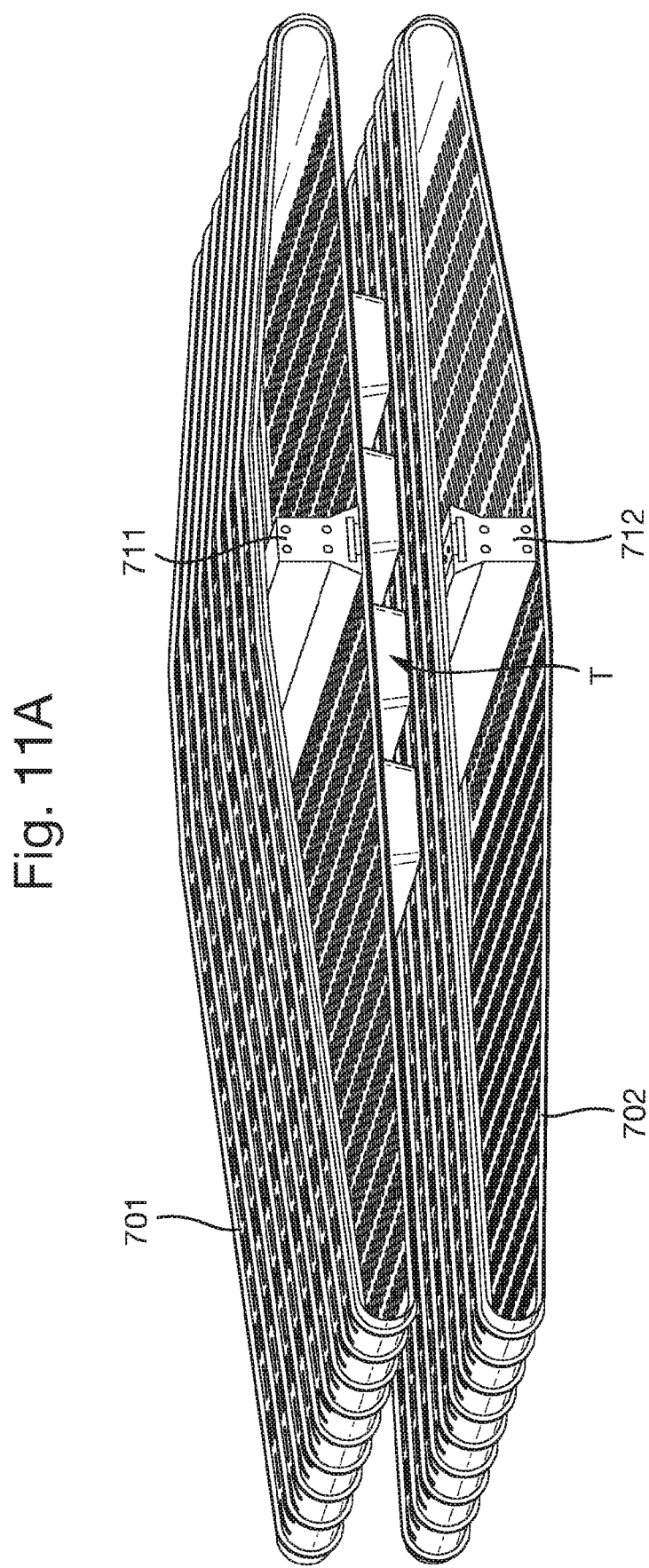

CONTAINER LEAK DETECTION

FIELD OF THE INVENTION

The present invention relates to systems, methods and devices for detecting breaches in sealed containers, and in particular sealed, modified atmosphere food containers, such as trays and packets.

BACKGROUND TO THE INVENTION

Modified atmosphere packaging (MAP) is widely practiced in the food packaging industry as a way of reducing spoilage of produce and increasing shelf life. MAP typically comprises modifying the composition of the gas that is present alongside food product in a food container so that it is different from the standard atmospheric composition in a way which maximises the longevity of the food product. This will typically involve increases and decreases of the proportion of oxygen, nitrogen and/or carbon dioxide in the atmosphere within food packages.

When food is packaged using modified atmosphere packaging, any incomplete sealing of the packaging reduces or nullifies entirely the increased shelf life provided by the MAP process as the atmosphere within the package is allowed to return to standard atmospheric composition.

In order to try to identify containers which have a breach, i.e. an opening into the package which renders them incompletely sealed, packages are mechanically tested, typically in-line. Mechanical testing typically comprises mechanically squeezing the container and identifying an expected response as the pressure within the sealed package increases and the package resists the mechanically squeezing. Such methods of mechanically testing packages are typically very slow, which can limit the maximum production speed, or require many separate lanes to keep up with faster packaging systems. Such methods may also have limited sensitivity, leading to false negatives.

Alternative off-line systems are available, which use vacuum to urge gases out of the pack via the any breach. However, these are also typically very slow and so, to maintain production speeds, it is necessary to test multiple packs at a time. This has numerous limitations; there is no way to identify the fault pack when a leak is detected, all packs tested must be rejected. Therefore many "good" packs are lost, increasing operation costs. These systems are often placed later in the packing process, typically when the packs have been collated into large multi-pack cases. This causes further delay in feedback of failures and an error in the packing process may continue to produce "bad" packs for some time. The system size is also much larger and requires more factory space for its operation.

Laser technology has recently been developed which, when provided with an air sample, can accurately and precisely identify, for example, its carbon dioxide content. It has been identified as desirable to incorporate such technology within food packaging production lines as a means of identifying sealed food containers which have breaches by taking a sample of the air surrounding the container after packaging and identifying raised levels of one of the relevant gases relative to standard atmospheric composition. Such laser technology is based on a principle called tunable diode laser absorption spectroscopy (TDLAS), which measures the concentration of species in gaseous mixtures using tunable diode lasers and laser absorption spectrometry. Compared to other measurement techniques, such as paramagnetic detectors ("PMD") and Chemi-luminescence, TDLAS offers multi-element detection capabilities, high accuracy with a wide dynamic range, low maintenance requirements, and a long life cycle. The use of lasers as spectroscopic light sources allows for high resolution spectroscopy (HRS), with quantum cascade lasers (QCLs) offering access to the valuable mid infrared (MIR) part of the electromagnetic spectrum. An example of a QCL system may be found in WO 03087787 A1.

SUMMARY OF THE INVENTION

The present inventors have found, in trying to implement gas-detecting laser technology into systems and methods for detecting breaches in sealed food containers, that the sensitivity required to detect breaches in food containers is such that normal fluctuations that occur in real-world packaging facilities prevent consistent, reliable identification of a change in gas levels which would be associated with a breach in a modified atmosphere package. The present invention has therefore been developed to make the implementation of this technology feasible.

In accordance with a first aspect of the invention, there is provided a leak detection system for detecting breaches in sealed food containers, the leak detection system comprising: air-sample testing equipment configured to test the composition of an air sample provided to the air-sample testing equipment; at least one pressing member configured to, in use, apply pressure to the sealed food container located in the air-sampling region; at least one air-sampling port located in the air-sampling region; an air sample conduit extending between the at least one air-sampling port and the air-sample testing equipment; wherein, in use, the at least one air-sampling port takes an air sample from the air-sampling region at least during or after the at least one pressing member applies pressure to the sealed food container in the air-sampling region and communicates said air sample through the air sample conduit to the air-sample testing equipment.

The present inventors have found that a pressing member that applies pressure to the food container causes gas within a breached container to be forced out and into the region surrounding the container. This increases the amount of gas from within the container in the air-sampling region, i.e. the region surrounding the container and proximate to the air-sampling port, which therefore increases the likelihood of the change in proportionality of gases resulting from a breach being detectable by the air-sample testing equipment over normal background fluctuations.

In order to most conveniently integrate into existing production lines, and to maximise throughput, in preferable embodiments, the pressing member is configured to apply pressure to the sealed food container while the sealed food container moves relative to the pressing member. This may be achieved, for example, by providing a pressing member comprising at least one rotatable roller and/or wheel, which may rotate while applying pressure, thereby allowing the sealed food container to continue to move while in contact with the pressing member.

While the above described mechanism of pressing a container to force the modified atmosphere of a package out into the air-sampling region helps make breaches detectable, it has been found that manipulating the environment by introducing gas from a controlled source can improve results in numerous ways. It is therefore preferable that the system further comprises at least one gas-output port, communicatively coupled, in use, to a gas source (preferably a compressed gas source), and configured to exhaust gas (preferably to and/or around the air-sampling region) at least before and/or whilst the at least one air-sampling port takes the air sample from the air-sampling region. The at least one gas-output port may simply purge the air-sampling region with gas of known composition before and/or during testing, or may more precisely direct the output gas, some examples of which will be described in more detail below.

In a particularly preferable embodiment, the at least one gas-output port is configured to generate an air curtain before, whilst and/or after the at least one air-sampling port takes the air sample from the air-sampling region. An air curtain is considered to be a continuous and directed broad stream of air which acts as a barrier separating the atmosphere on one side from that on the other. Depending on the environment in which the system is disposed, a single air curtain may markedly improve the performance of the system, however, in preferable embodiments, the at least one gas-output port is configured to generate the air curtain at least partially surrounding the at least one air-sampling port, and preferably substantially surrounding the at least one air-sampling port. In addition, the air curtain may also at least partially or substantially surround the at least one pressing member. An air curtain that surrounds the at least one air-sampling port can significantly reduce background fluctuations observed by the air-sample testing equipment by substantially isolating the air-sampling region from the wider system environment. While it is preferable that the air curtain substantially surrounds the at least one air-sampling port, isolation from the wider environment can be achieved in other ways. For example, if the pressing member and/or air-sampling port are at least partially enclosed within an external housing, one or more air curtains can be used to close one or more openings in the external housing (for example, openings through which a conveyor conveys the containers), thereby effectively isolating the air-sampling region from the wider environment.

In some embodiments, the system comprises a plurality of air-sampling ports, and the pressing member is located between a first subset of the plurality of air-sampling ports and a second subset of the plurality of air-sampling ports. By providing the pressing members between air-sampling ports, the air-sampling ports are more likely to sample air as it is forced out of the package by the pressing member, thereby improving the performance of the system.

In particularly preferable embodiments, the system comprises at least two pressing members, wherein the at least one air-sampling port is located between the at least two pressing members. Such embodiments, in which (some of) the air-sampling ports are located between two pressing members allow favourable handling of sealed bags in particular. In general, it is desirable to place the air-sampling port(s) as close as possible to the location at which the pressing member contacts the sealed food container to maximise the ability of the system to detect breaches. However, when the sealed container is a bag, the pressure applied can cause the bag to inflate on either side of the pressing member, rather than increase the internal pressure in the bag. The at least two pressing members act together to ensure increased internal pressure and to urge the gas from any breach in the bag.

It is preferable that the pressing member, air-sampling port(s) and gas-output ports are compactly provided in the system and are all positioned proximate the sealed food container to improve performance. Therefore, it has been found to be preferable that the pressing member, at least one air-sampling port, and optionally, if provided, the at least one gas-output port are provided on a common leak detection head. While this is preferable, one or more of these features could be provided independently of the others within the system.

In some embodiments, at least one air-sampling port is located on or in the pressing member. Providing an air-sampling port on or in the pressing member can improve the performance of the system by allowing the air sample to be taken very close to the point of contact between the pressing member and the sealed food container.

The pressing member may comprise a porous material configured to contact the sealed food container, in use. This can prevent the pressing member itself from temporarily obstructing a breach in the food container as it applies pressure to the food container. Further, the porous material may cover at least one air-sampling port. Embodiments in which a porous material covers at least one air-sampling port advantageously allow for an air sample to be taken through the porous material by an air-sampling port on or in the pressing member.

Embodiments which feature the above mentioned porous material may further be configured such that at least one gas-output port exhausts gas into the porous material. This may be used to purge the porous material of gas trapped therewithin before an air sample is taken, which can improve the accuracy and precision of the testing results. In particularly preferable embodiments, the porous material at least partially covers the surface of the at least one rotatable roller and/or wheel. In such embodiments, the at least one gas-output port may be configured to exhaust gas into an area of the porous material before said area of the porous material contacts the sealed food container in use. This may be implemented by providing that an area of the porous material is purged by exhausted gas while the phase of rotation of the roller or wheel is such that said area of porous material is not in contact with the container. Particularly in these embodiments, it is preferable that at least one gas-output port is located on or in the pressing member.

In some embodiments, at least one air-sampling port and/or at least one gas-output port is mounted on a fixed shaft of the at least one rotatable roller and/or wheel, the at least one rotatable roller and/or wheel rotating about the fixed shaft in use. In such embodiments, for example, the air-sampling port may be provided on the shaft facing towards a container in use so as to sample air proximate the container. Similarly, the gas-output port may be provided on the shaft facing away from the container in use, which is preferable in embodiments in which a porous material of the roller is purged.

As mentioned above, it may be preferable that the system further comprises at least a first conveyor, preferably a first conveyor belt, for conveying the sealed food container to, through and/or away from the air-sampling region.

In some embodiments, the at least one pressing member comprises a conveyor belt configured to apply pressure to the sealed food container as it is conveyed through the air-sampling region. Like a roller or a wheel, a conveyor is able to maintain contact with the surface of a sealed food container as it moves through the air-sampling region.

In embodiments which comprise a conveyor as part of the pressing member and a conveyor for conveying the sealed food container, preferably the conveyor belt of the pressing member opposes the first conveyor such that the sealed food container is conveyed through the air-sampling region between the conveyor belt of the pressing member and the first conveyor. That is to say that the sealed food container will be sandwiched between the conveyor as it passes through the air-sampling region.

As mentioned, in preferable embodiments, the pressing member comprises a porous material. Preferably, the material that forms one or both of the belts of the conveyors described above is porous by way of perforations in the surface of the conveyor belts. Further preferably, a surface of one or both of the first conveyor and the conveyor belt of the pressing member comprises an array of protrusions for contacting the sealed food container in use. The array of protrusions may take the forms of bumps or ridges. Such protrusions will prevent the surface of the conveyor from blocking any breaches in the sealed food container.

Further preferably, the at least one air-sampling port is arranged inside one or both of the first conveyor and the conveyor belt of the pressing member. An-air sampling port may be arranged inside a conveyor belt by providing the air-sampling port between the opposing halves of a conveyor belt assembly. One or more air sampling ports may be arranged on an air-sampling port head located within the conveyor belt of the pressing member and/or one or more air sampling ports may be arranged on an air-sampling port head located within the first conveyor.

Preferably, the system further comprises a vacuum pump connected to the air sample conduit for communicating vacuum suction to the at least one air-sampling port.

In some embodiments, the pressing member, air-sampling port, and optionally, if provided, the gas-output port are at least partially enclosed within an external housing. In such embodiments, the sealed food containers may be provided into the external housing for sampling, the external housing at least partially shielding the air-sampling region from the wider system environment.

It will be appreciated that, when the sealed food container is a film-topped tray, leaks are most likely to be found in the top of the container. However, leaks may also be found in the other surfaces, for example the sides and bottom of a container, which is particularly true when the sealed food container is, for example, a sealed bag. Therefore, some embodiments comprise a plurality of air sampling ports, wherein a first subset of air-sampling ports take an air sample from a first side of a sealed food container and a second subset of air-sampling ports take an air sample from a second side of the sealed food container. It will be appreciated that any container can be considered to essentially have six 'sides': top, bottom, front, rear, and left-hand and right-hand sides. The sensitivity of the system can be increased by increasing the number of these 'sides' that are sampled. In embodiments where an air sample is taken from at least two sides, preferably these two sides are opposite one another. Particularly preferably, a third subset of air-sampling ports takes an air sample from a third side of the sealed food container, and preferably wherein a fourth subset of air-sampling ports takes an air sample from a fourth side of the sealed food container. The most preferable construction is one in which the sides of the container from which the air samples are taken are those sides around the direction of conveyance of the sealed food container.

In accordance with a second aspect of the invention, there is provided a method of detecting breaches in sealed containers comprising: applying a pressure to a sealed container located in an air-sampling region using a pressing member; taking an air sample from the air-sampling region during and/or after applying the pressure to the sealed container; communicating the air sample to air-sample testing equipment; testing the composition of the air sample using the air-sample testing equipment to determine whether there is a breach in the sealed container.

This method of detecting breaches in sealed containers is suitable for implementation using a system according to the first aspect of the invention, and is particularly suited for detecting breaches in sealed food containers. The method provides the same advantages as the system according to the first aspect of the invention.

The method according to the second aspect of the invention is particularly suited to detecting breaches in sealed, modified atmosphere containers. However, it will be appreciated that the method could also be used for detecting breaches in containers with no modified atmosphere by performing the method in a controlled atmosphere, different from the atmosphere within the container.

In preferable embodiments, the pressing member applies pressure to the sealed container while the sealed container moves relative to the pressing member.

In some embodiments, the method further comprises exhausting gas at least before and/or whilst the at least one air-sampling port takes the air sample from the air-sampling region.

Particularly preferable embodiments of the method further comprise generating an air curtain, and preferably taking the air sample from the air-sampling region comprises taking the air sample from one or more locations substantially surrounded by the air curtain.

In preferable embodiments, taking an air sample from the air-sampling region comprises taking an air sample through a porous material forming a part of the pressing member used to contact the sealed container when applying the pressure to the sealed container.

In particularly preferable embodiments, exhausting gas comprises exhausting gas through an area of the porous material before the air sample is taken through said area of the porous material.

In some embodiments, taking an air sample from the air-sampling region during and/or after applying the pressure to the sealed container comprises taking an air sample from a first side of a sealed container and taking an air sample from a second side of the sealed container. Preferably the first and second sides are opposite one another. In particularly preferable embodiments, taking an air sample from the air-sampling region further comprises taking an air sample from a third side of a sealed container, and optionally, further comprises taking an air sample from a fourth side of the sealed container.

The above preferable features of the method according to the second aspect of the invention provide the same advantages as the equivalent features in the system according to the first aspect of the present invention.

Additionally, it is preferable in methods according to the invention that testing the composition of the air sample using the air-sample testing equipment comprises testing the carbon dioxide, oxygen and/or nitrogen content of the air sample, and it is determined that there is a breach in the sealed container when the carbon dioxide, oxygen and/or nitrogen content of the air sample meets pre-set criteria. Preferably, the pre-set criteria include that the rate of change in the carbon dioxide, oxygen and/or nitrogen content of the air sample is greater than a threshold value. This threshold value may be, for example, at least two to three times that of the average rate of change caused by background noise.

In accordance with a third aspect of the invention, there is provided a leak detection head for detecting breaches in sealed food containers suitable for use in the system according to the first aspect invention, and for implementing the method according to the second aspect of the invention. The leak detection head comprises: at least one pressing member configured to, in use, apply pressure to a sealed food container; at least one air-sampling port; a test equipment port; an air sample conduit extending between the at least one air-sampling port and the test equipment port; at least one gas-output port, communicatively coupled, in use, to a gas source (preferably a compressed gas source); wherein, in use, the at least one gas-output port exhausts gas (preferably to and/or around the air-sampling region) at least before or whilst the at least one air-sampling port takes an air sample from the air-sampling region and communicates said air sample through the air sample conduit to the test equipment port for testing.

Preferably the pressing member is configured to apply pressure to a sealed food container while the sealed food container moves relative to the pressing member. This may be achieved, for example, by providing a pressing member comprising at least one rotatable roller and/or wheel, which may rotate while applying pressure, thereby allowing the sealed food container to continue to move while in contact with the pressing member.

In a particularly preferable embodiment, the at least one gas-output port is configured to generate an air curtain whilst the at least one air-sampling port takes the air sample from the air-sampling region. In preferable embodiments, the at least one gas-output port is configured to generate the air curtain substantially surrounding the at least one air-sampling port, and preferably also substantially surrounding the at least one pressing member. An air curtain that surrounds the at least one air-sampling port can significantly reduce background fluctuations observed by the air-sample testing equipment by substantially isolating the air-sampling region from the wider system environment.

In some embodiments, the leak detection head comprises a plurality of air-sampling ports, and the pressing member is located between a first subset of the plurality of air-sampling ports and a second subset of the plurality of air-sampling ports. Alternatively, or in addition, at least one air-sampling port is located on or in the pressing member.

The pressing member may comprise a porous material configured to contact the sealed food container, in use. Further, the porous material may cover at least one air-sampling port. Embodiments in which a porous material covers at least one air-sampling port advantageously allow for an air sample to be taken through the porous material by an air-sampling port on or in the pressing member.

Preferably, at least one gas-output port is located on or in the pressing member. Further, preferably at least one gas-output port is configured to exhaust gas into the porous material.

In some embodiments, the porous material at least partially covers the surface of the at least one rotatable roller and/or wheel. Particularly in these embodiments, preferably the at least one gas-output port is configured to exhaust gas into an area of the porous material before said area of the porous material contacts the sealed food container in use.

In some embodiments, at least one air-sampling port and/or at least one gas-output port is mounted on a fixed shaft of the at least one rotatable roller and/or wheel, the at least one rotatable roller and/or wheel rotating about the fixed shaft in use.

Preferable embodiments comprise a plurality of air-sampling ports, wherein a first subset of air-sampling ports take an air sample from a first side of a sealed food container and a second subset of air-sampling ports take an air sample from a second side of the sealed food container. These first and second sides may preferably be opposite one another. Particularly preferably, a third subset of air-sampling ports takes an air sample from a third side of the sealed food container, and preferably wherein a fourth subset of air-sampling ports takes an air sample from a fourth side of the sealed food container.

Preferably, the at least one pressing member comprises a conveyor belt configured to apply pressure to the sealed food container. Further preferably, a surface of the conveyor belt is perforated. In some embodiments, the at least one air-sampling port is located inside the conveyor belt.

The above preferable features of the third aspect of the present invention provide the same advantages as the equivalent features in the system according to the first aspect of the present invention, and method according to the second aspect of the invention.

In accordance with a fourth aspect of the invention, there is provided a leak detection head for detecting breaches in sealed food containers, the leak detection head comprising: at least two pressing members configured to, in use, apply pressure to a sealed food container; at least one air-sampling port, the at least one air-sampling port being located between the at least two pressing members; a test equipment port; an air sample conduit extending between the at least one air-sampling port and the test equipment port.

The preferable features described above with respect to the first and third aspects apply equally to the leak detection head of this fourth aspect.

BRIEF DESCRIPTION OF THE DRAWINGS

Examples of systems, methods and devices in accordance with the present invention will now be described with reference to the accompanying drawings, in which:

FIGS. 2A to 2C show a leak detection head according to the first embodiment in cross-sectional, perspective and bottom views respectively;

FIGS. 3A to 3C show a leak detection head according to a second embodiment in perspective, cross-sectional and longitudinal section views respectively;

FIG. 9 shows, schematically, a leak detection system according to a sixth embodiment;

FIG. 10 is a flow diagram showing a method of detecting breaches in sealed containers; and FIGS. 11A to 11D show a leak detection system according to a seventh embodiment of the in perspective, top, side and front views respectively.

DETAILED DESCRIPTION

Figure 1:
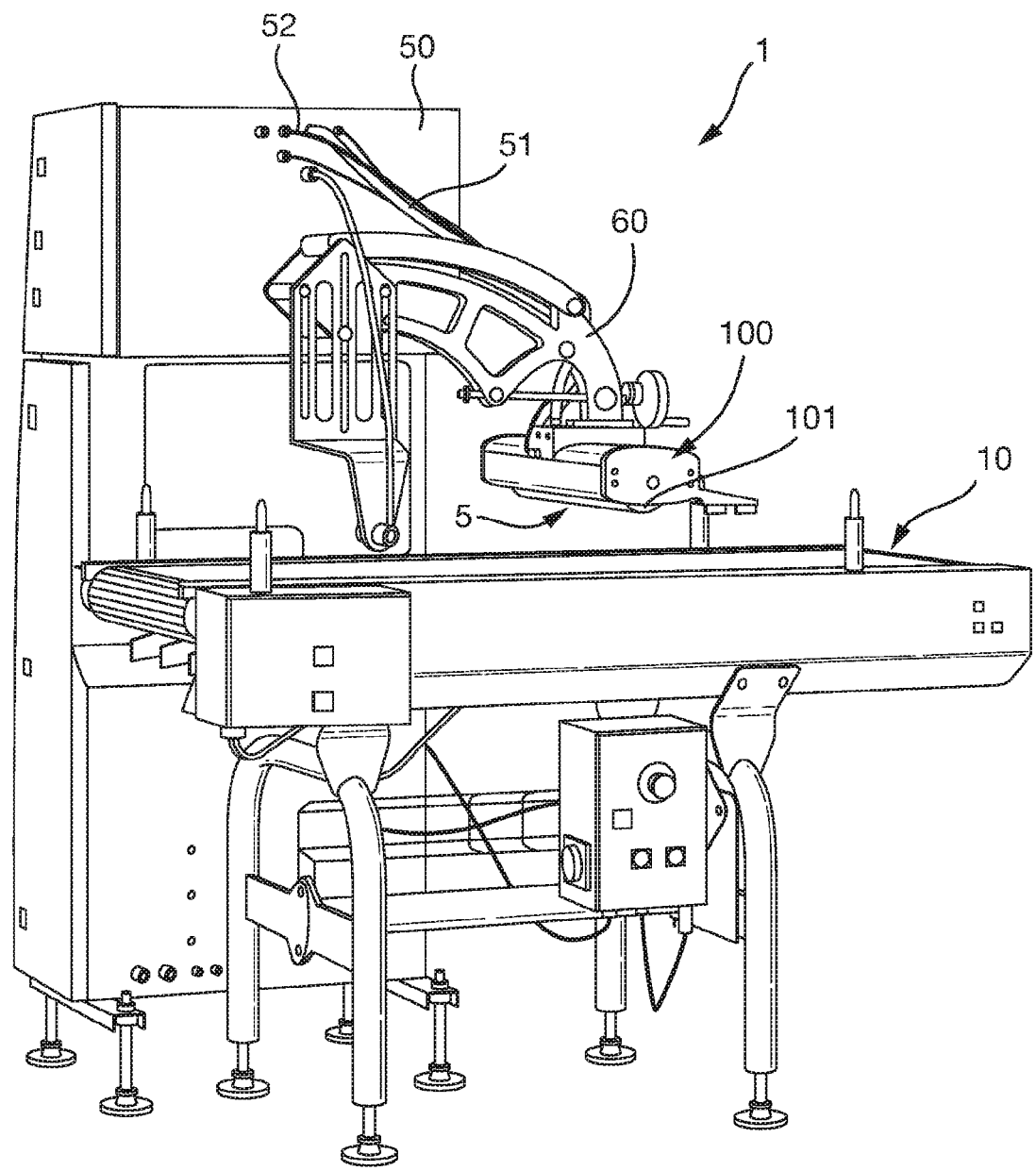
FIG. 1 shows a first embodiment of a leak detection system and leak detection head according to the invention.

FIG. 1 shows a first embodiment of a system 1 for detecting breaches in sealed food containers. The system comprises a conveyor 10 for conveying the sealed food containers through an air-sampling region 5. A leak detection head 100 is adjustably positioned above the conveyor 10 at the air-sampling region. The leak detection head 100 is supported over the conveyor by a mounting arm 60 coupled to the exterior of an equipment housing 50 that is positioned adjacent to the conveyor 10. An air sample tube (air sample conduit) 51 and compressed air tubes 52 extend from the equipment housing 50 to the leak detection head 100, as will be described in greater detail below.

The leak detection head 100 comprises a pressing member, in this case a roller 101, which has an axis of rotation parallel to the surface of the conveyor and perpendicular to the direction of conveyance of the conveyor. The roller 101 has a radius such that it projects down from the leak detection head 100 towards the conveyor 10, leaving a gap between the roller 101 and the conveyor which is configured, by adjusting the height of the leak detection head 100, to be slightly smaller than the height of the type of sealed food container to be tested.

As a sealed food container is conveyed along the conveyor 10, through the air-sampling region 5, it passes beneath the leak detection head 100. The roller 101, projecting down from the leak detection head 100 towards the conveyor 10, contacts an upper surface of the container and rotates as the container passes through the air-sampling region 5. Since the gap between the roller 101 and the conveyor 10 is slightly smaller than the height of the food container, a force is applied to the surface of the container across the contact area between the container and the roller. This pressure applied to the container acts to force an amount of gas out of the container through any breaches in the container. If there is no breach in the container, no gas will be forced out of the package.

Any gas forced through breaches in the container is then sampled by air-sampling ports 102 located on the leak detection head 100, and transferred through the air sample tube 51 into the equipment housing 50. The sample is drawn into the air-sampling ports 102 and along the air sample tube 51 by a vacuum pump (not shown) located inside the housing 50 in fluid communication with the air-sampling ports 102 via the air sample tube 51. Inside the housing is further located test equipment (not shown) which comprises a quantum cascade laser. The sample is provided to the test equipment for testing by the air sample tube 51. In this embodiment, the test equipment measures the rate of change in carbon dioxide levels and displays these in a graphical format.

Figure 2A:
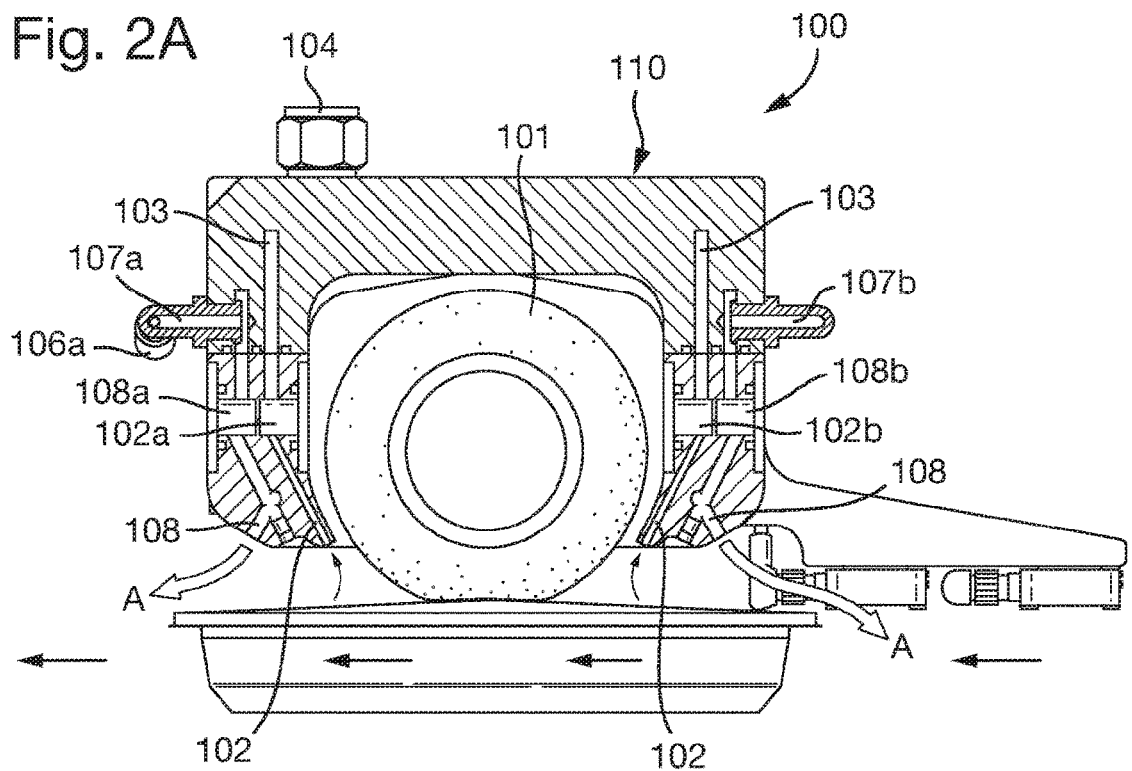
Figure 2B:
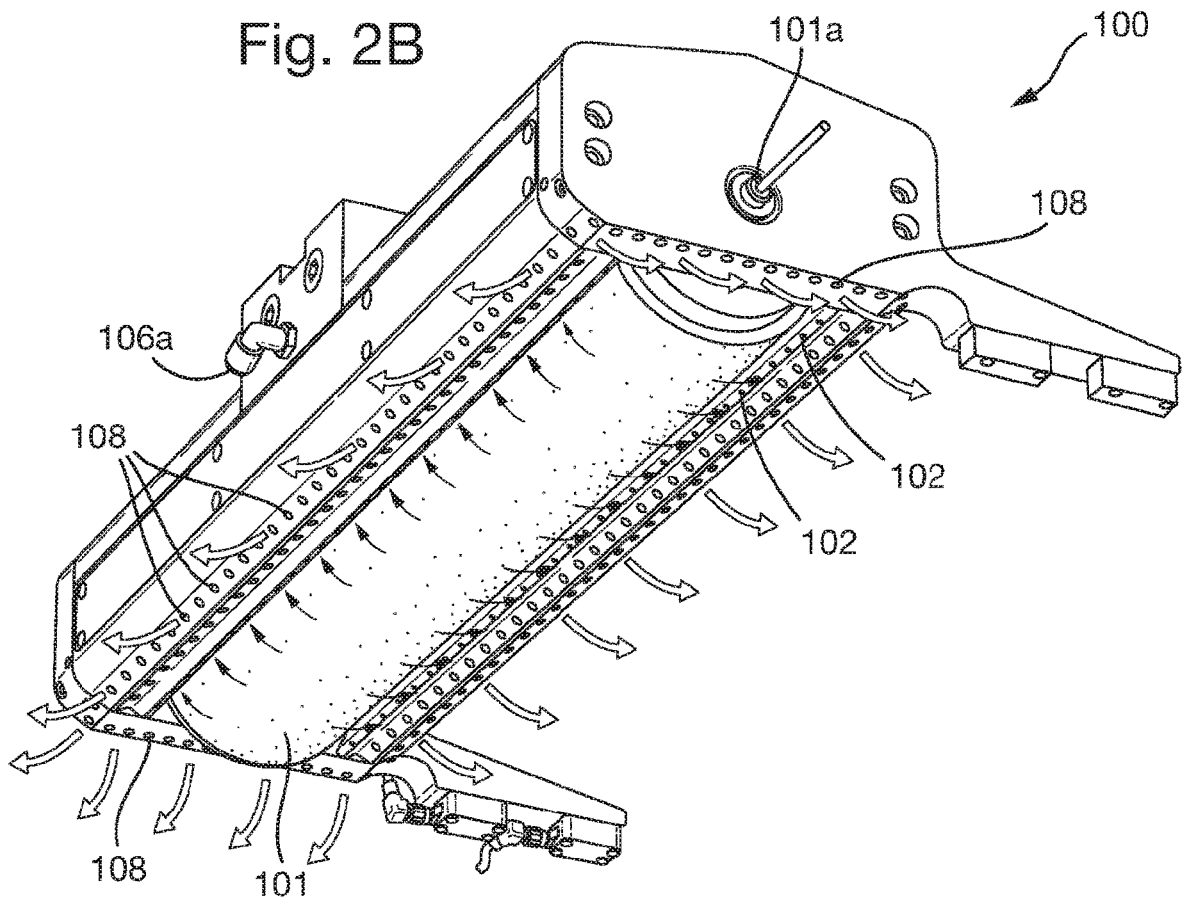

The construction of the leak detection head 100 will now be described in more detail with reference to FIG. 2.

The leak detection head 100 comprises a generally cuboidal housing 110 whose long axis lies across the width of the conveyor 10 in use. The housing 110 extends across the full width of the conveyor, and is open at its lower surface (i.e. the surface that faces the conveyor in use). Rotatably mounted within the housing 110 is the cylindrical roller 101. The axis of rotation of the roller is along the long axis of the housing, and the radius of the roller is such that it protrudes through the opening in the lower surface of the housing. The roller is mounted on bearings 101a, 101b located in respective end plates of the housing 110. In this embodiment, the roller is driven by means well known in the art. In other embodiments, the roller may be made to rotate about its axis through contact with a tray, which is moved beneath the leak detection head by the conveyor 10.

The leak detection head 100 comprises a plurality of air-sampling ports 102. The air-sampling ports are small circular openings into the leak detection head that are provided in two rows running along the long axis of the housing 110, in the lower surface of the housing, with one row on either side of the opening in which the roller 101 is located. Each row of air-sampling ports 102 has a respective manifold 102a, 102b. The air-sampling ports 102 of each row are in fluid communication with their respective manifold through a respective conduit. The manifolds 102a, 102b feed into additional air sample conduits, which meet in the upper portion of the housing 110, and communicate with a test equipment port 104 through the upper surface of the housing 110. When incorporated into the system 1 of FIG. 1, the test equipment port 104 is connected to the air-sample tube 51. In use, vacuum suction is communicated through the air-sample tube 51, and via the test equipment port to the manifolds and individual air-sampling ports 102 so that the air-sampling ports 102 each draw air into them, thereby collecting a sample from the air-sampling region. The air sample is then conveyed up to and along the air-sample tube 51 to the testing equipment.

The leak detection head 100 further comprises a plurality of gas-output ports 108. The gas-output ports 108 are small circular openings into the leak detection head that are provided around the periphery of the lower surface of the housing. The gas-output ports 108 define a rectangle on the lower surface of the housing, within which are located the air-sampling ports 102 and the roller 101. The gas-output ports 108 connect via respective conduits into one of two manifolds 108a, 108b in the leak detection head 100. Those gas-output ports 108 on a first side of the axis of the roller connect to the first manifold 108a and those on a second side of the axis of the roller connect to the second manifold 108b. Each manifold 108a, 108b is connected by a respect conduit 107a, 107b to a respective compressed-gas port 106a, 106b through a respective sidewall in the housing 110. In use, each compressed-gas port 106a, 106b communicates compressed gas from a compressed gas source (not shown) through the conduits and manifolds to the plurality of gas-output ports 108. The compressed gas source will typically comprise gas of standard atmospheric composition, such that it does not affect the testing performed by the testing equipment. In use, the compressed gas is directed by each gas-output port 108 diagonally down and away from the leak detection head 100, the plurality of gas-output ports 108 in combination generating an air curtain extending down and outward from the periphery of the lower surface of the leak detection head 100 (as shown by arrows A in FIG. 2A). The air curtain acts to isolate the atmosphere beneath the leak detection head 100 from turbulence and other environmental factors that may cause fluctuations in atmospheric composition. As a container is moved beneath the leak detection head 100, it enters within the air curtain. Any carbon dioxide from the packaging process that is encouraged towards the sampling region by the motion of the food packages travel along the conveyor is displaced by the air curtain, and an air sample can be obtained from the region around the container within the controlled environment inside the air curtain. As a leaking container exits the air-sampling region, the air curtain helps in purging the elevated levels of carbon dioxide, stabilising the environment in the sampling region ready for the next package to be inspected.

Figure 3C:
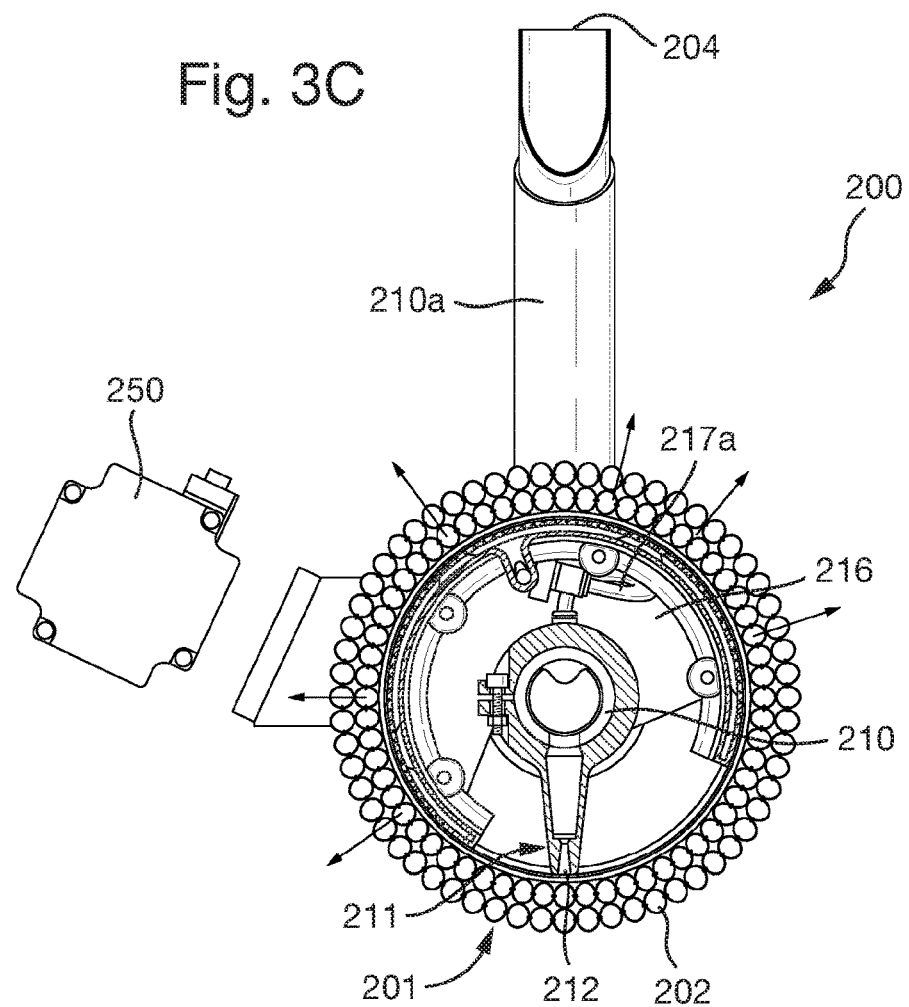
Figure 4A:
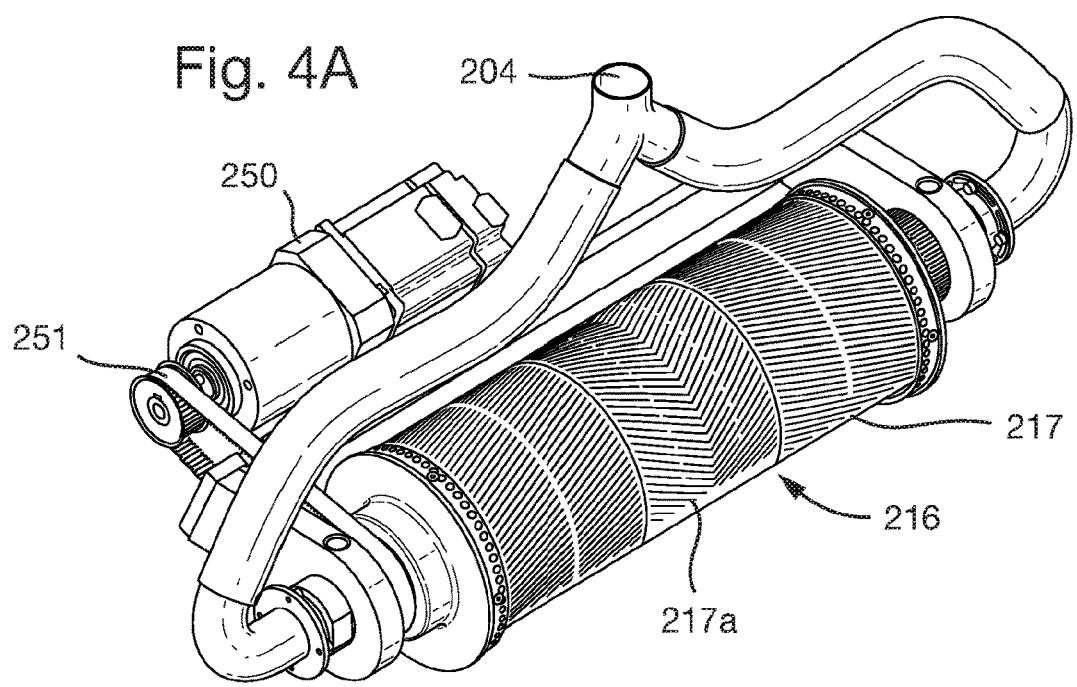
FIGS. 4A and 4B show the leak detection head according to the second embodiment in upper and lower perspective views respectively, and in first and second states of disassembly respectively.
Figure 4B:
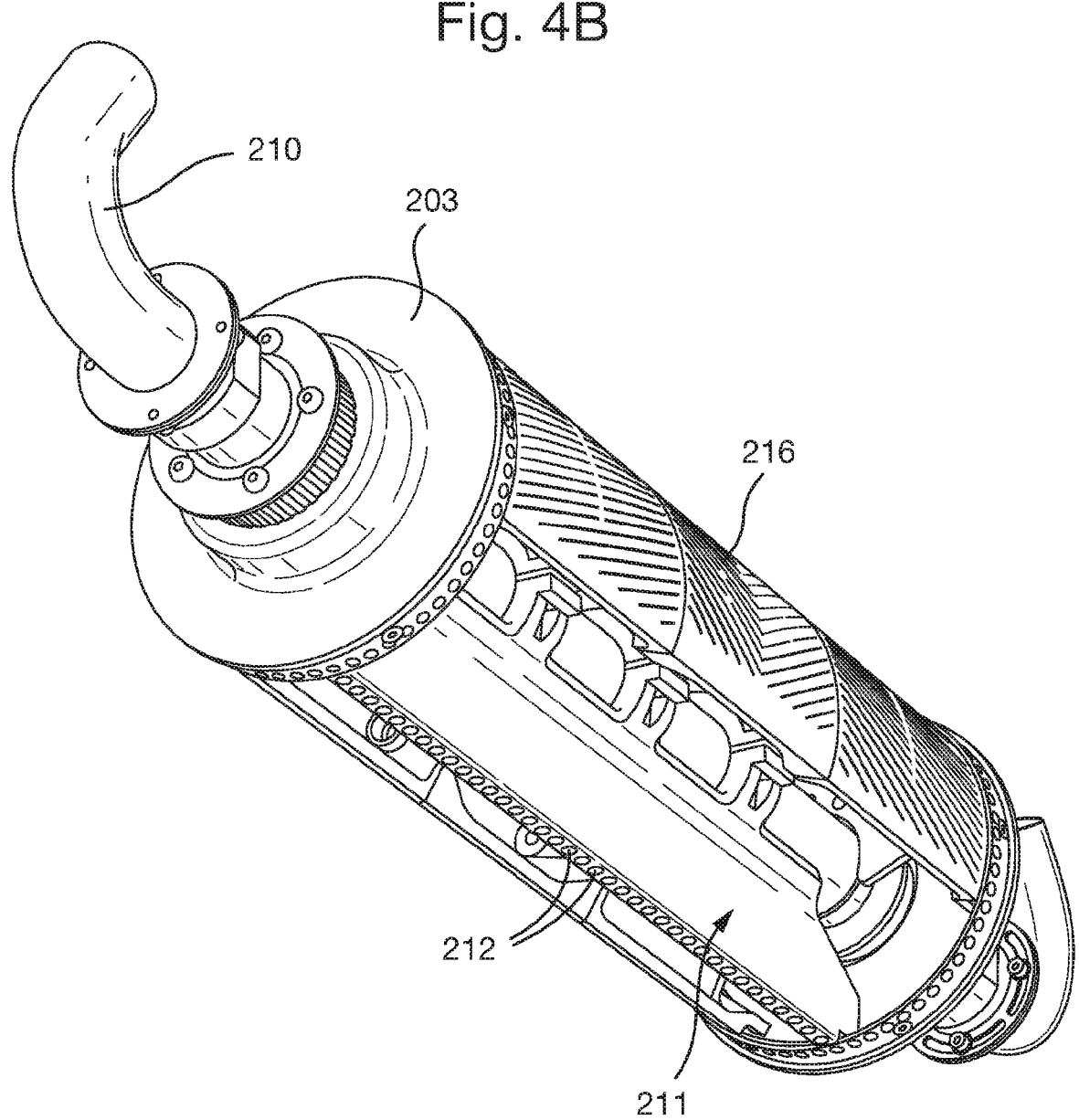

The system described with reference to FIG. 1 can be implemented with a number of different types of leak detection head. A second leak detection head will now be described with reference to FIGS. 3 and 4.

The leak detection head 200 according to the second embodiment comprises a single roller 201. The roller comprises a cylindrical sleeve 202 formed of a porous material, for example, an open cell foam or laser printed open structure roller. The cylindrical sleeve 202 is closed at either end by endplates 203, which are rotatably mounted to a fixed shaft 210 that runs coaxially through the sleeve and extends beyond either endplate 203. The rotatable endplates 203 allow the sleeve 202 to rotate about the shaft 210 while the shaft remains fixed. In use, rotation of the sleeve 202 is driven using a belt 251 and a motor 250, mounted adjacent to the roller, which cooperate with one of the end plates 203. Within the rotatable sleeve 202 is a roller core coupled to or formed integrally with the fixed shaft such that it does not rotate with the sleeve 202. The roller core comprises an air purge system 216 and air-sampling system 211, which will be described in more detail below.

The air-sampling system 211 comprises a sampling head 213 which extends downwardly from the fixed shaft 210. The lower surface of the sampling head is proximate the inner surface of the sleeve 202 and extends along the full length of the roller, within the sleeve 202. The lower surface of the sampling head has a line of air-sampling ports 212 therethrough, which face the inner surface of the sleeve 202 of porous material along the length of the roller, and are in fluid communication within a manifold 213a within the sampling head 213. The manifold 213a opens into a hollow interior of the fixed shaft 210. The hollow interior of the fixed shaft extends with the shaft out of both ends of the roller 201 and continues with the shaft, which turns to face generally upwardly, where it ceases. Both ends of the shaft are connected in use to a respective tube 210a, 210b. The tubes 210a, 210b meet at an inverted Y connector, and provide fluid communication with a single test equipment port 204. In use, the test equipment port 204 is connected to an air-sample tube (51 in FIG. 1) through which vacuum suction is communicated. The vacuum suction is transmitted through the test equipment port, tubes 210a, 210b, hollow shaft interior 210, and manifold to the individual air-sampling ports 212 so that the air-sampling ports 212 each draw air into them for communication back to the test equipment. In this embodiment the air drawn into the sampling ports has been drawn through the porous material of the sleeve 202.

The air purge system 216 comprises a gas-output sleeve 217 that is mounted on the fixed shaft 210. The outer surface of the gas-output sleeve 217 is proximate the inner surface of the sleeve 202 of porous material. The gas-output sleeve 217 extends along the full length of the roller, within the sleeve 202, and extends around beneath approximately three quarters of the circumference of the inner surface of the sleeve 202 of porous material. The gap in the gas-output sleeve 217, i.e. the approximately one quarter of the circumference in which the gas-output sleeve 217 is not provided, permits the sampling head 213 to extend to the inner surface of the sleeve of porous material. The gas-output sleeve 217 has a surface that is covered in small, slot shaped gas-output ports 217a. The gas-output ports are connected to one of two compressed gas sources, in use, by one of two tubes 217a, 217b each extending from the inner surface of the gas-output sleeve 217 to the fixed shaft. Each tube 217a, 217b connects to a respective conduit within the fixed shaft, separate from the hollow interior for communicating an air sample, which extends along the fixed shaft, in opposite directions, and past the respective end plate 203 which form the ends of the roller 201. Each conduit then connects to a respective compressed gas input port 218a, 218b in the fixed shaft, which can be connected to a respective compressed gas source, in use, by means that will be apparent to the skilled person.

Operation of the leak detection head 200 will now be described. In use, the leak detection head 200 is located over a conveyor such that a gap between the roller 201 and the conveyor is slightly smaller than the height of the type of sealed food container to be tested. The end plates 203 and sleeve 202 of the roller 201 are driven by the belt 251 and motor 250 to rotate such that the surface of the sleeve 202 moves at the same speed as the conveyor. A container is conveyed along the conveyor, and passes beneath the roller 201. Since the gap between the roller 201 and the conveyor is slightly smaller than the height of the food container, a force is applied to the surface of the container across the contact area between the container and the roller 201. This pressure applied to the container acts to force an amount of gas out of the container through any breaches in the container. While the roller 201 applies a pressure to the container, the air-sampling ports 212 continuously draw air into the air-sampling system 211, through the porous material where it contacts the container. The porous material, which lies between the air-sampling ports 212 and the container, acts to provide some protection from turbulence and other environmental changes which would affect the composition of the sampled air. An air sample is continuously provided via the air-sampling ports 212, manifold 213a, shaft 210, tubes 210a, 210b, test equipment port 204 and air-sample tube 51 to the test equipment for composition testing. As the roller 201 rotates, the area of the sleeve through which a sample was drawn rotates around the shaft so it is over the gas-output sleeve 217. Compressed gas is exhausted by the gas-output ports 217a and forced through the porous material, purging the porous material of any gas trapped therein. The sleeve 202 continues to rotate until the now purged area of porous material passes the end of the gas-output sleeve 217, and arrives again at the air-sampling location, i.e. between the air-sampling ports 212 and a container (if present).

A third leak detection head 300 will now be described with reference to FIGS. 5 and 6.

Figure 5A:
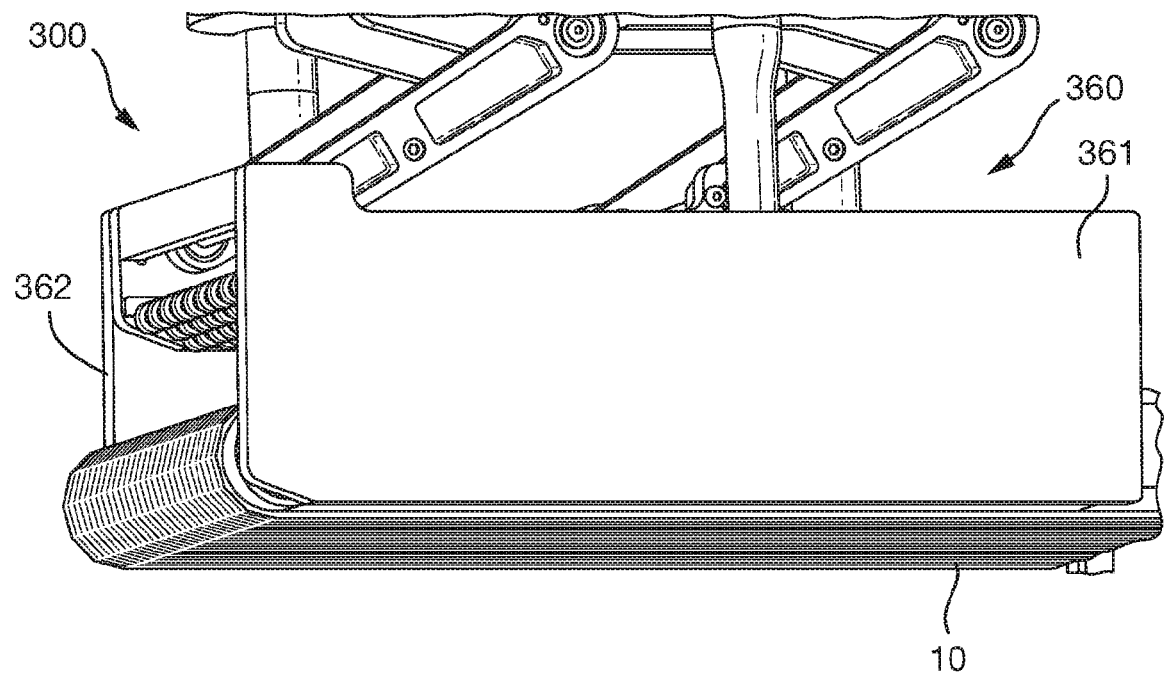
FIGS. 5A to 5C show a leak detection head according to a third embodiment in a perspective view, in a perspective view with an external housing removed, and in zoomed view with an external housing removed.
Figure 6:
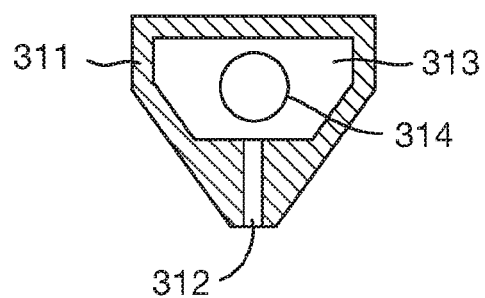
FIG. 6 shows a cross-sectional view of the air-sampling head of the third embodiment.

The leak detection head 300, as shown in FIG. 5A, is partially enclosed within an external housing 360. Two side walls 361 and 362, in combination with an upper surface of the leak detection head and the conveyor 10, define a partially enclosed, generally cuboidal region, with openings at the front and rear ends of the conveyor into which containers may enter. The partially enclosed region helps to shield the air-sampling region within from the wider system environment, and reduce fluctuations in atmospheric composition therewithin. As mentioned above, the front and rear entrances could also, optionally, be closed by an air curtain to further isolate the air-sampling region.

Figure 5B:
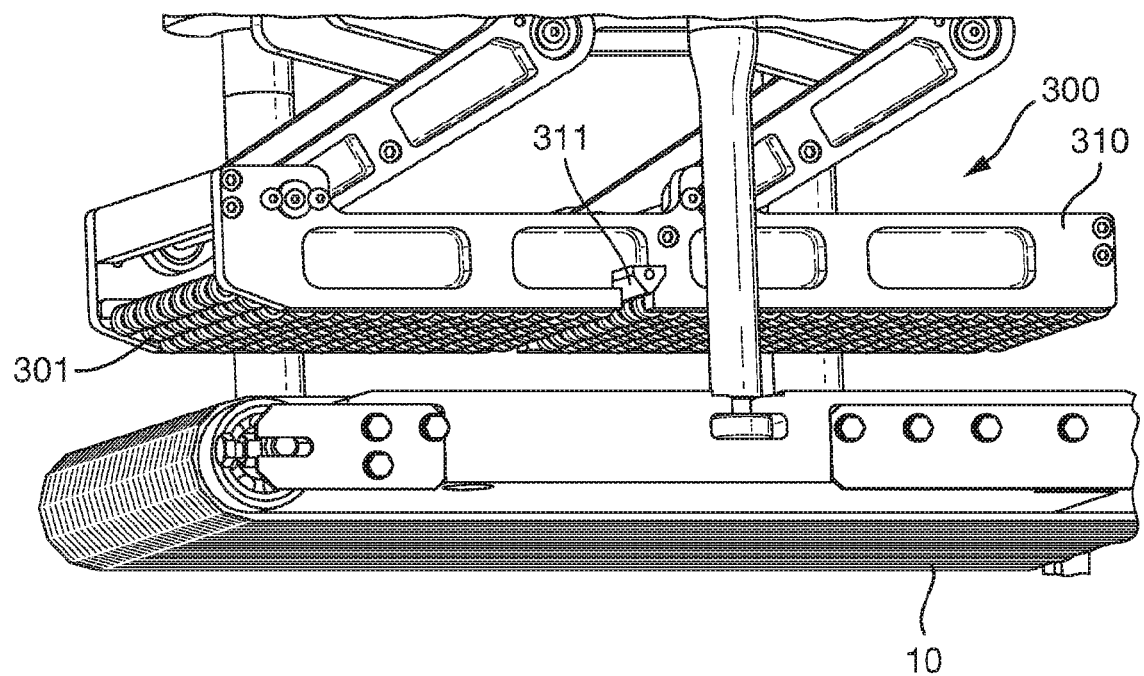
Figure 5C:
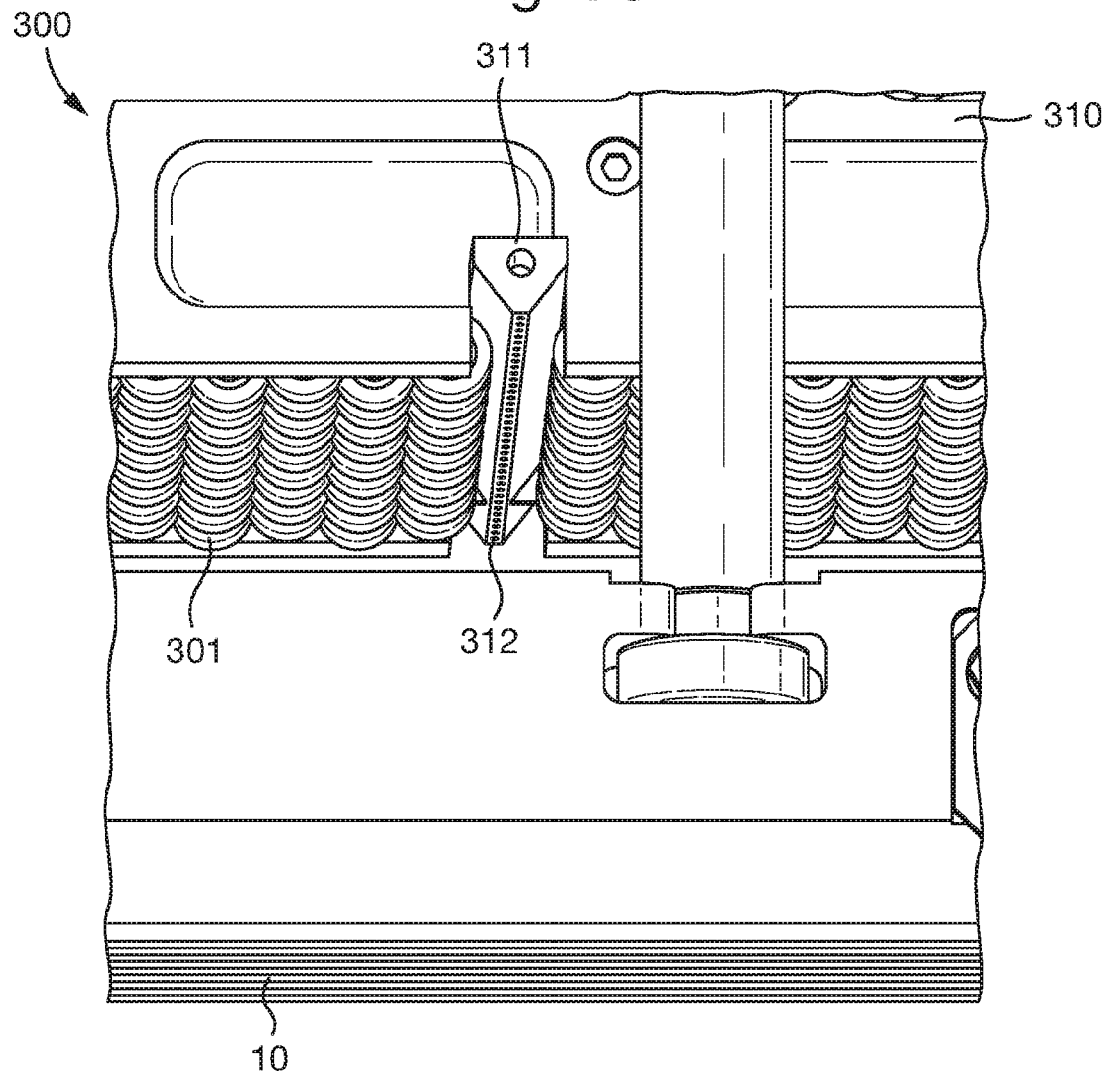

FIG. 5B shows the leak detection head 300 with the side walls 361 and 362 of the external housing removed. The leak detection head comprises leak detection head housing 310, which is defined by an upper surface, from which two sidewalls project downward. An array of rollers or wheels 301 form a pressing surface of the leak detection head at a lower surface of the leak detection head, facing the upper surface of the conveyor 10. The wheels 301 are mounted in closely packed repeating rows, each row having a spindle (not shown) about which the wheels of that row rotate. Each spindle is positioned parallel with the surface of the conveyor beneath 10, and perpendicular to the direction of conveyance of the conveyor 10. All of the spindles, and wheels 301 thereon, are mounted between sidewalls of a leak detection head housing 310, at the lower edge of the sidewalls.

The first three rows of wheels 301 on the leak detection head 300 are positioned at a progressively lower position, such that, when the leak detection head 300 is positioned above the conveyor 10, the second row is closer to the conveyor than the first, and the third row closer to the conveyor than the second. The remaining rows of wheels 301 are positioned at the same height above the conveyor in use as the third row of wheels. This configuration of the wheels 301 allows the pressure applied to the container to be gradually increased as the container enters underneath the leak detection head, before a relatively steady pressure is reached and maintained.

In approximately the centre of the leak detection head 300, in a gap between two rows of wheels 301, is an air-sampling head 311. The air-sampling head is also shown in cross-section in FIG. 6. The air-sampling head extends in the same direction as the rows of wheels, across the direction of conveyance of the conveyor 10. The air-sampling head 311 comprises, in a lower surface, facing the conveyor in use, a plurality of air-sampling ports 312, lined in a row extending across the conveyor. Each air-sampling port 312 is connected via a respective conduit to a manifold 313 in the air-sampling head 311. At either lateral end of the air-sampling head 311, is a test equipment port 314, which, in use, is connected so as to be in fluid communication with an air sample tube (51 in FIG. 1), which connects to the test equipment, and provides the vacuum suction to the air-sampling head 311.

In use, a container is provided to the conveyor 10, and conveyed into the external housing 360 and beneath the leak detection head 300. The height of the array of wheels 301 above the conveyor is configured to be smaller than the height of a container to be tested so that as the container enters beneath the leak detection head 300 it is pressed by the leak detection head. The container is conveyed along and past the air-sampling head 311. As it passes the air-sampling head 311, air, which is being continuously drawn into the air-sampling head 311 via the air-sampling ports 312, is sampled from a region above the container, and communicated through to the test equipment. The container continues and exits from beneath the leak detection head 300 at the rear of the conveyor 10.

A fourth leak detection head 400 will now be described by reference to FIG. 7. The leak detection 400 comprises a housing 410, which accommodates first and second rotatably mounted rollers 401a, 401b. The first and second rollers are mounted horizontally between the opposing side walls 411, 412 of the housing 410. The axes of the first and second rollers are parallel, and in use the axes lie across the width of the conveyor 10 in a plane above and parallel to the conveyor 10. Each roller 401a, 401b has an internal drum motor for rotating the rollers in use. The internal drum motors are powered via respective cables 411a, 411b which extends through the side wall 411 of the housing 410.

Figure 7A:
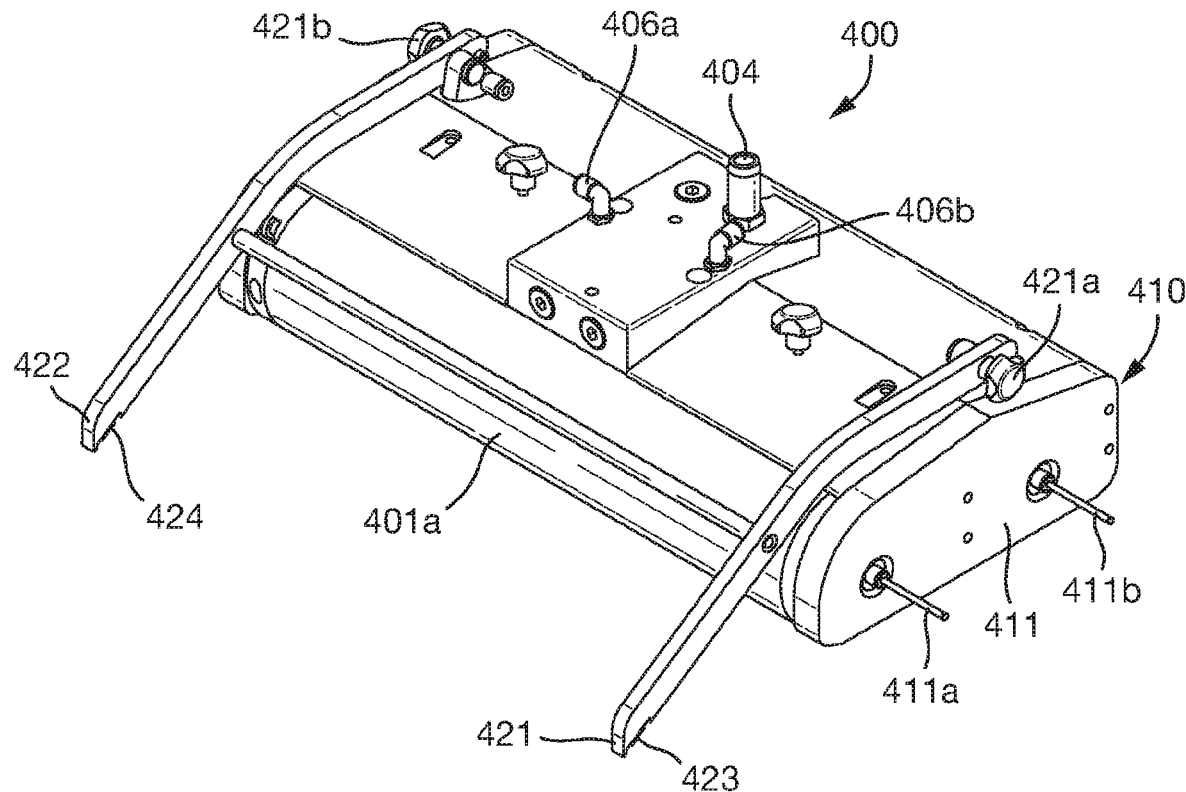
FIGS. 7A to 7F show a leak detection head according to a fourth embodiment in perspective, side, rear, bottom, front and cross-sectional views respectively.
Figure 7B:
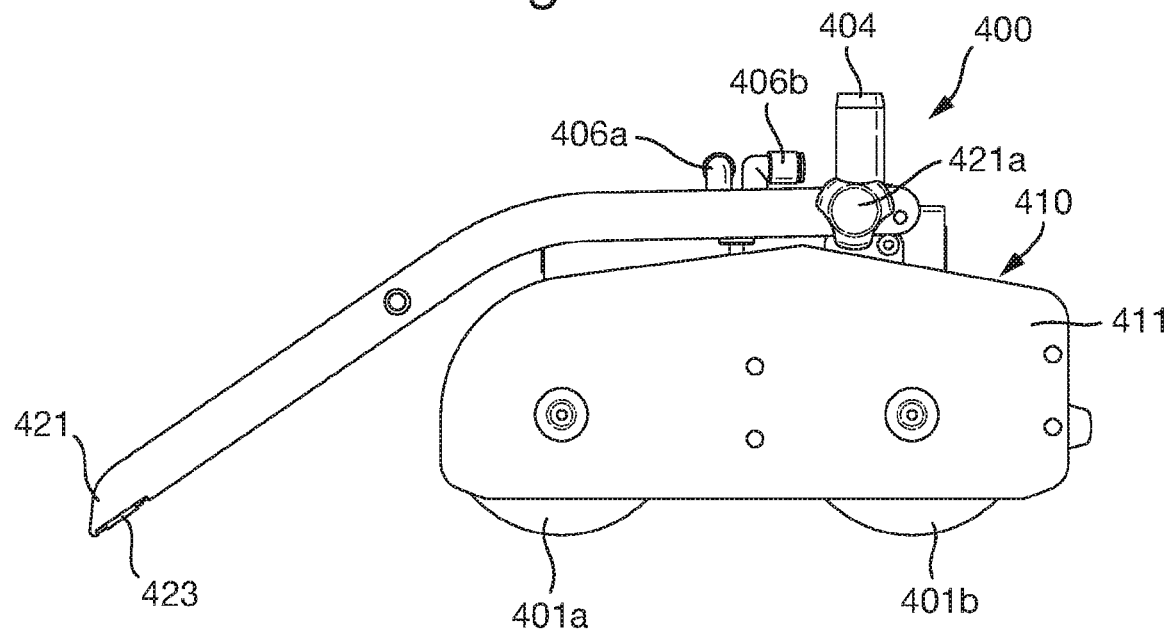
Figure 7C:
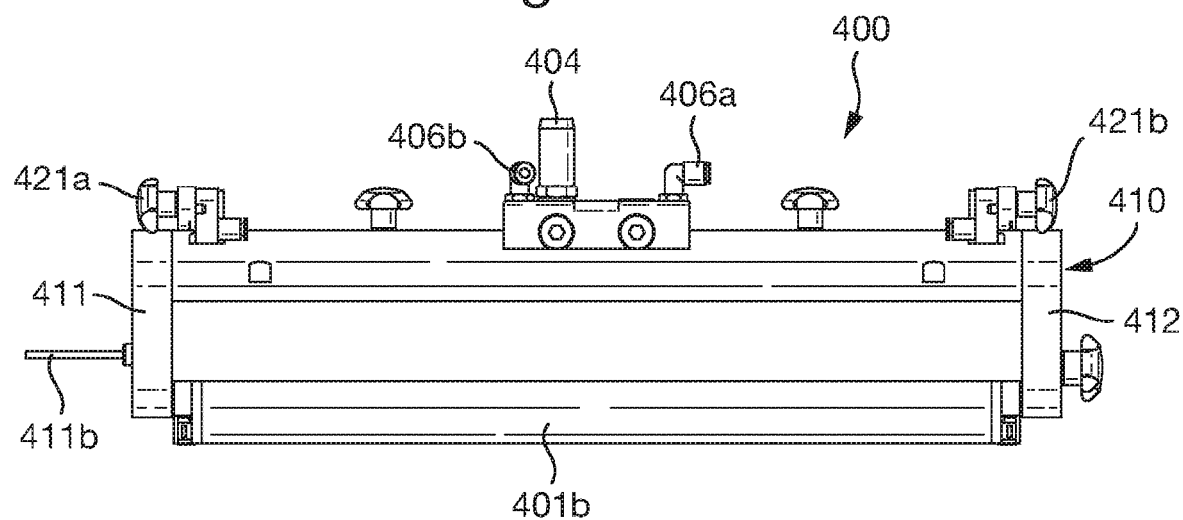
Figure 7D:
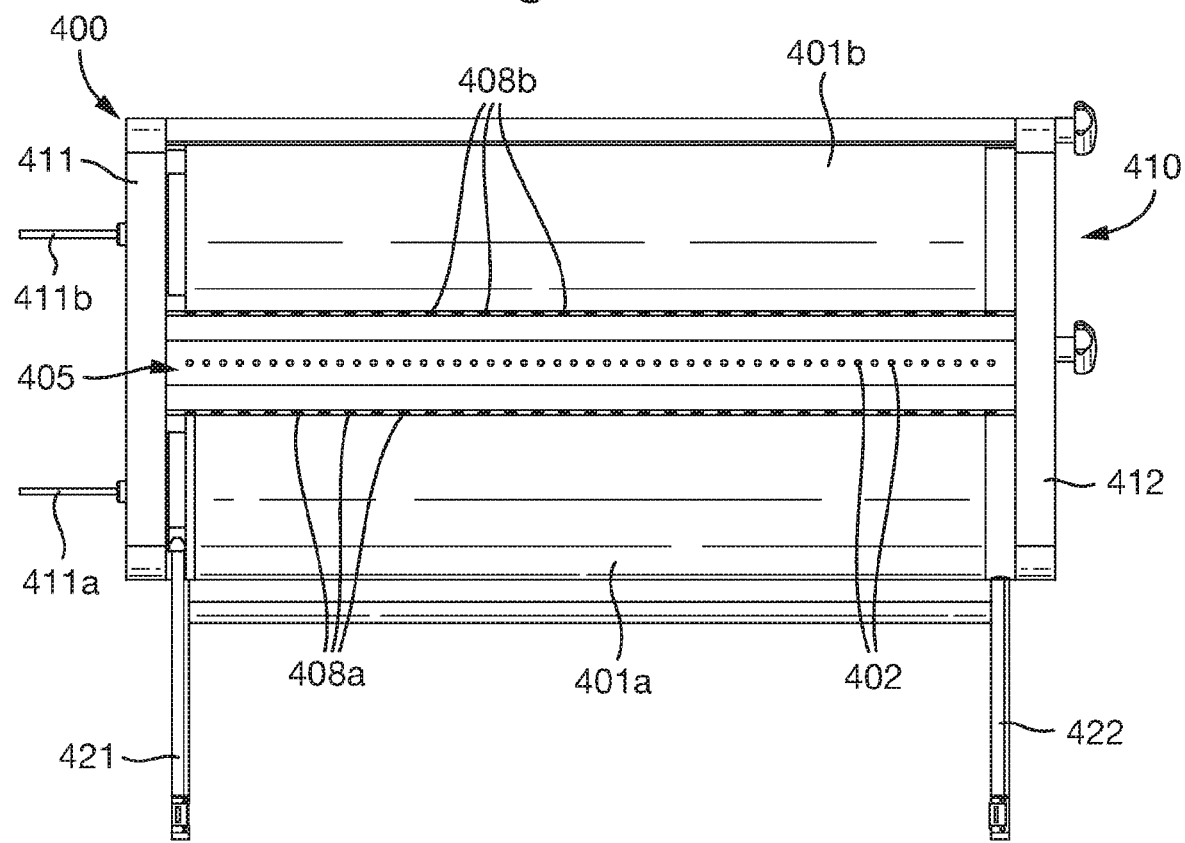
Figure 7E:
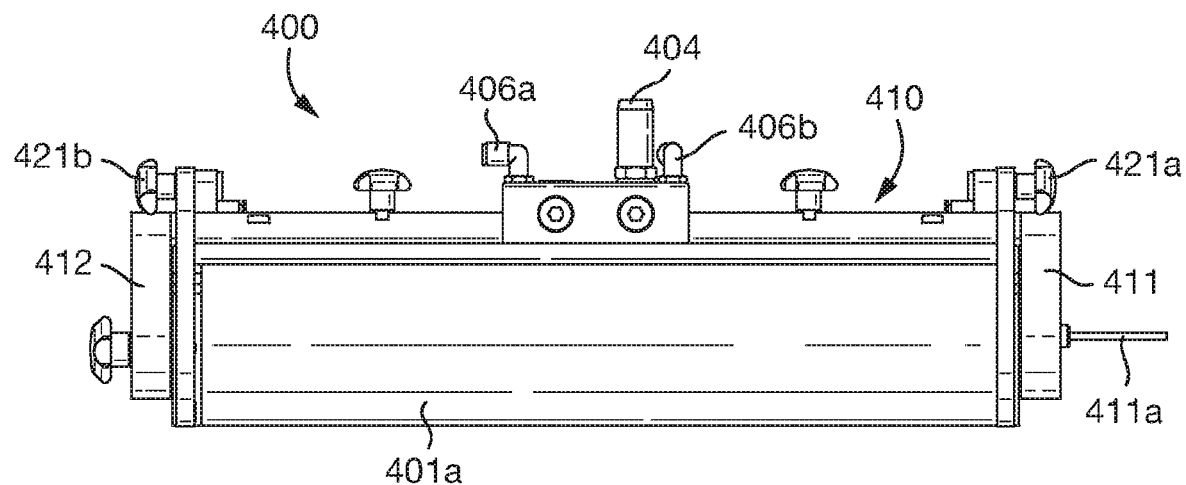
Figure 7F:
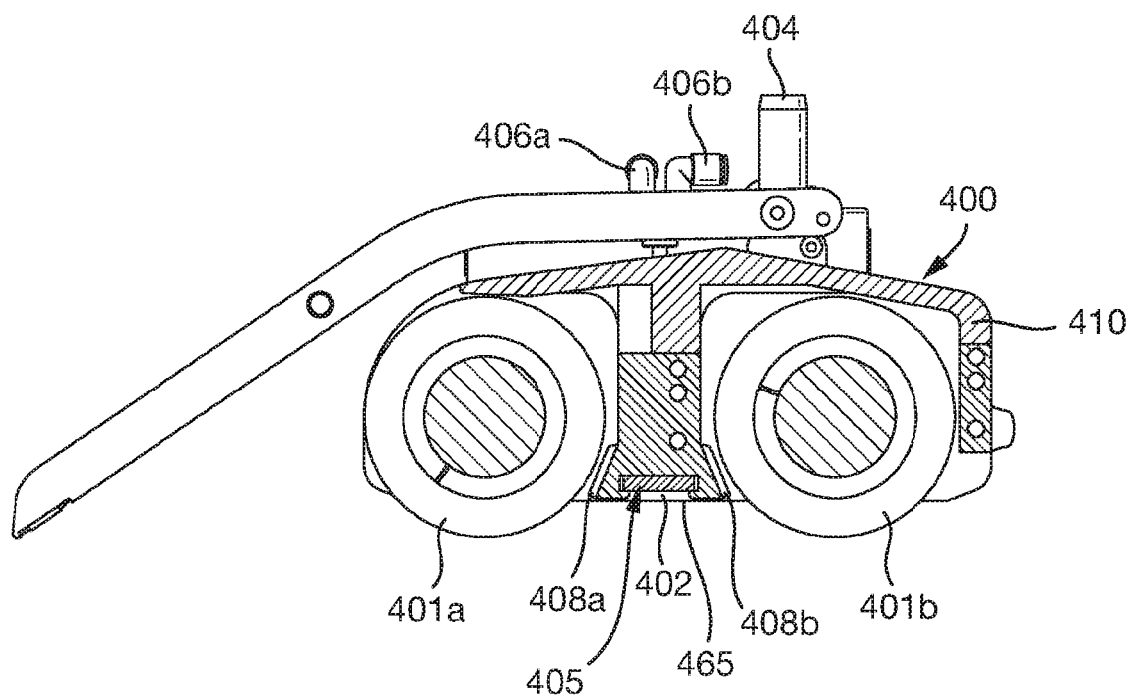
Figure 8A:
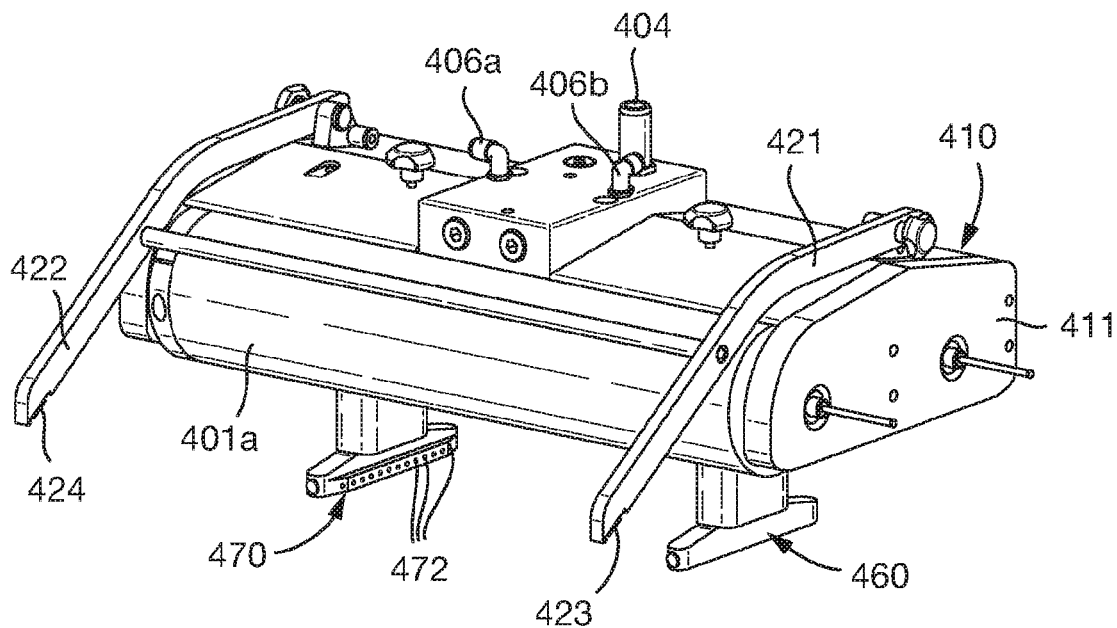
FIG. 8A to 8D show a leak detection head according to a fifth embodiment in first and second perspective views, front view and bottom view respectively.
Figure 8B:
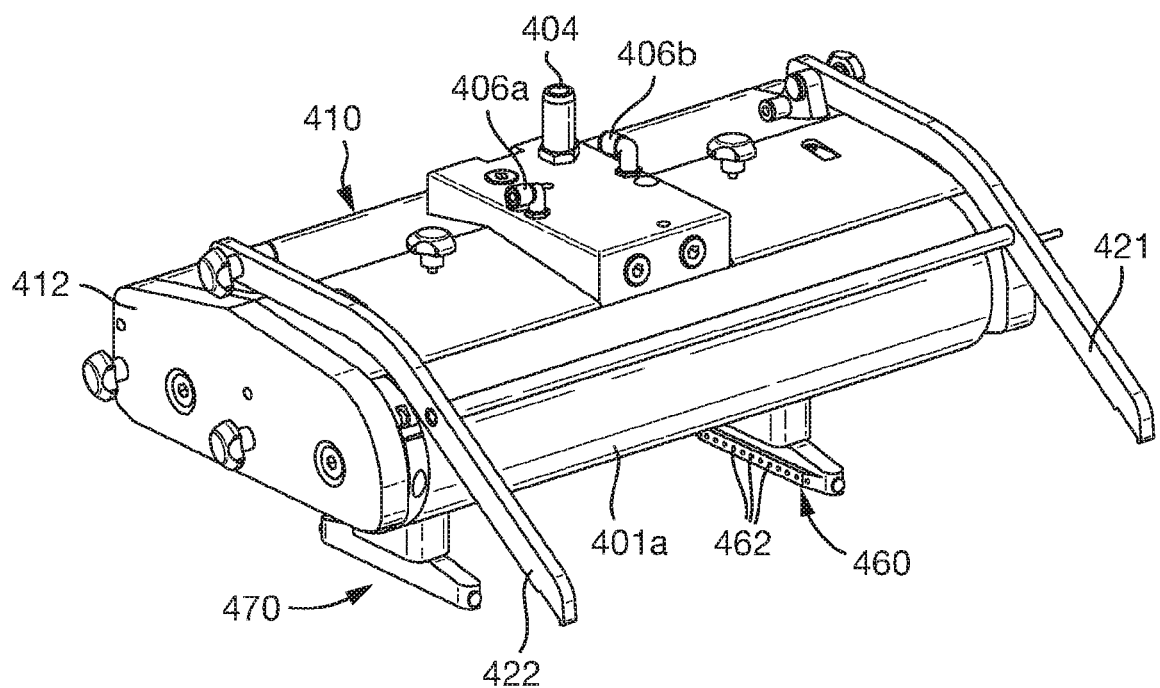
Figure 8C:
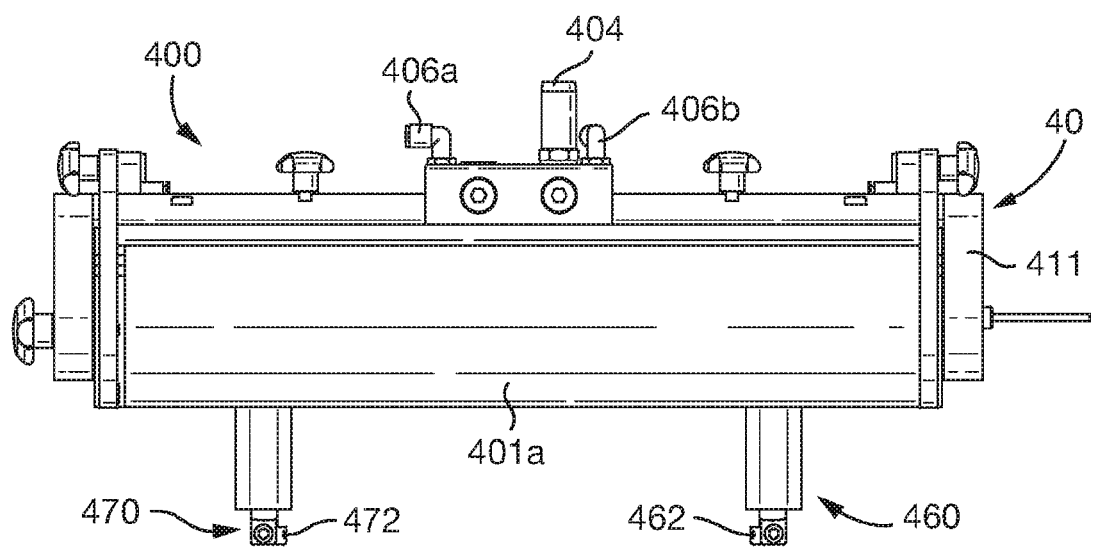
Figure 8D:
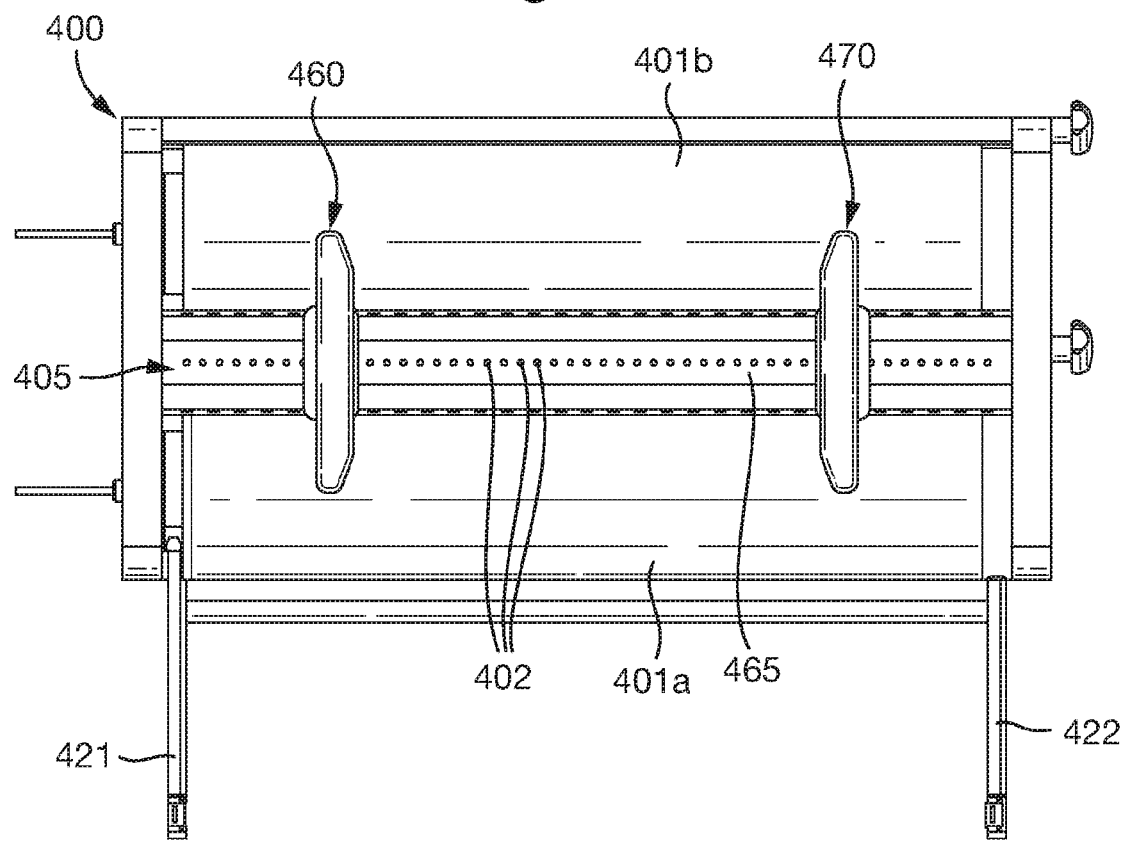
Figure 11B:
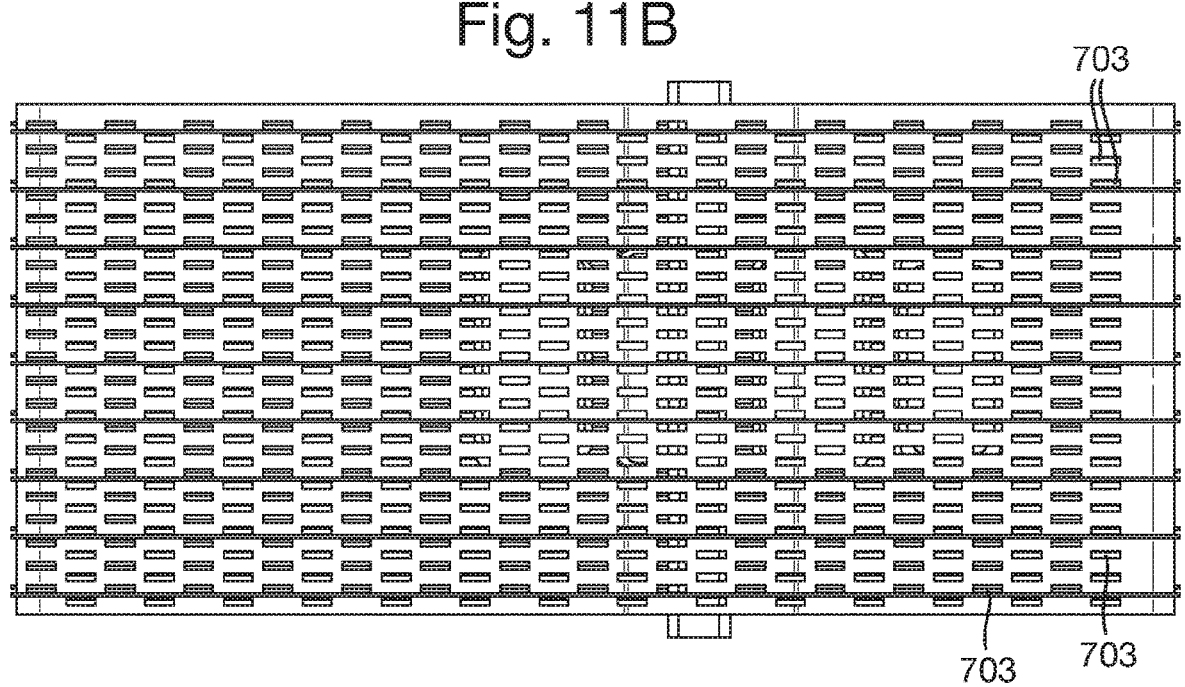
Figure 11C:
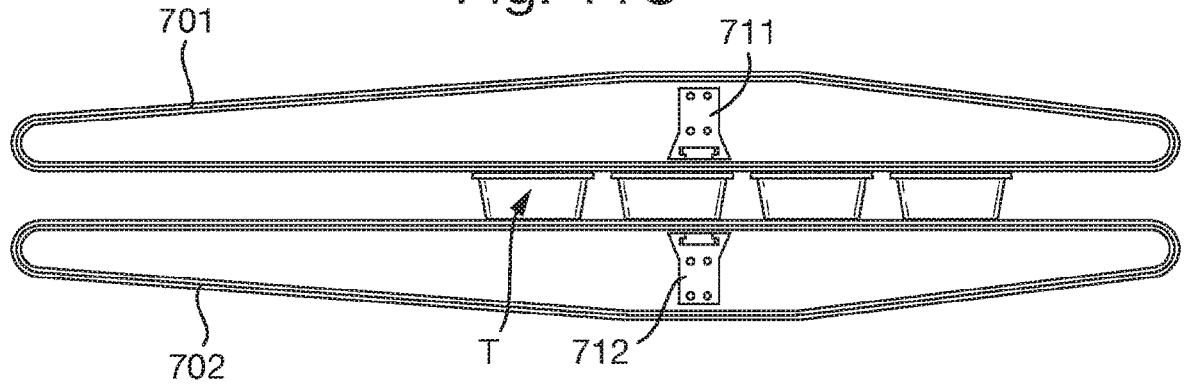
Figure 11D:
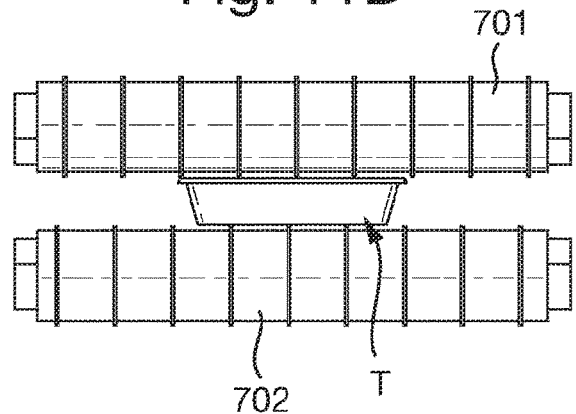

The housing is open at its lower surface to permit the rollers to protrude through the opening for contact with containers being conveyed along the conveyor. The housing is also open at its front (upstream end with respect to the conveyor), as shown in FIG. 7E, to expose the front surface of the front roller 401a. Exposure of the front surface of the front roller helps guide sealed bags underneath the leak detection head 400.

The first and second rollers 401a, 401b are spaced from one another in the housing 410 along the direction of conveyance of the conveyor 10. In between the rollers 401a, 401b is located a wall 405 inside the housing. The wall 405 extends from one side of the housing 410 to the other and extends from the top of the housing 410 to the opening in the bottom. At its lowest point, the wall 405 is slightly higher than the lowermost point of the rollers 401a, 401b, which protrude through the lower opening for contact with food containers. In the lower surface of the wall 405 is a plurality of air-sampling ports 402, as shown in FIG. 7D. The air-sampling ports are arranged in a single row located in a groove 465 running along the lower surface of the wall 405, such that the air-sampling ports 402 extend across substantially the full width of the leak detection head 400. The air-sampling ports 402 are each in fluid communication with a central manifold (not shown) inside the wall via a respective conduit. The manifold communicates with a test equipment port 404 through the upper surface of the housing 410. When incorporated into the system 1 of FIG. 1, the test equipment port 404 is connected to the air-sample tube 51. In use, vacuum suction is communicated through the air-sample tube 51, and via the test equipment port to the manifold and individual air-sampling ports 402 so that the air-sampling ports 402 each draw air into them, thereby collecting a sample from the air-sampling region, in between the two rollers 401a, 401b.

Running along either side of the row of air-sampling ports 402 are first and second sets of gas-output ports 408a, 408b. Each gas-output port connects via a respective conduit to one of two gas-output manifolds (not shown) in the central wall 405 of the housing 410. The two gas-output manifolds are in fluid communication with a respective compressed-gas port 406a, 406b in the upper surface of the housing 410. The sets of gas-output ports 408a, 408b are configured to generate respective first and second air curtains on either side of the row of air-sampling ports 402. The gas-output ports 408a, 408b are pointed diagonally down and away from the row of air-sampling ports such that the air curtains are directed down and away from the central wall 405 of the housing 410.

The leak detection head 400 also features first and second arms 421, 422 located on either side of the leak detection head and extending forward, beyond the front roller 401a, so as to be upstream of leak detection head 400 in use. Each arm is adjustably coupled to the upper side of the housing 410 via a respective thumbscrew. On the end of each arm 421, 422 are first and second sensors 423, 424. The sensors are photo optic sensors and are configured to detect an approaching food container. The first sensor 423 transmits a light source, which is detected by the second sensor 424 in the absence of any food container. The sensors, together, act as a light gate, which is broken when a food container passes between the sensors, allowing for detection and timing of the passage of the food container through the system. A control system has knowledge of the conveyor speed, and so can calculate the position of each individual food container for both sampling and reject actions. The first and second sensors 423, 424 detect an oncoming food container, in use, so that readings by the test equipment can be associated with the correct food container.

A fifth leak detection head will now be described with respect to FIG. 8. The fifth embodiment is substantially identical to the fourth, and further comprises first and second side-sampling attachments 460, 470.

Each side-sampling attachment 460, 470 has an inverted T-shaped construction. The upper end of the side-sampling attachment 460, 470 features a projection (not shown) which cooperates with the groove 465 in the lower surface of the wall 405, and allows the side-sampling attachments 460, 470 to each be mounted on the lower surface of the sampling head in a laterally adjustable fashion.

Once mounted to the lower surface of the wall 405 of the sampling head 400, the arms of each side-sampling attachment 460, 470, which give it the inverted T-shaped appearance, extend in the upstream and downstream directions, parallel to the direction of conveyance of the conveyor 10 in use. In use, a container to be tested passes between these side-sampling attachments, underneath the air-sampling head 400.

Each side-sampling attachment 460, 470 features, on its inner surface, i.e. the surface facing the opposing side-sampling attachment, a row of air-sampling ports 462, 472. The row of air-sampling ports extends along the arms of their respective side-sampling attachment 460, 470, parallel to the direction of conveyance in use. The air-sampling ports 462, 472 of each side-sampling attachment 460, 470 are in fluid communication with a respective manifold internal to the side-sampling attachment. Each manifold connects to a conduit, which extends up through the side-sampling attachment 460, 470, through an opening in the upper surface of the projection that sits in the groove 465 of the air-sampling head 400. The opening in the upper surface of each side-sampling attachment 460, 470 cooperates with at least one of the air-sampling ports 402 to communicate the vacuum suction to the air-sampling ports 462, 472, and to allow the air sample collected by the air-sampling ports 462, 472 to be communicated to the air sample testing equipment in use.

While side-sampling attachments are used in this embodiment, it will be appreciated that separate and distinct side-sampling heads could alternatively be used.

A sixth embodiment will now be described with respect to FIG. 9. This embodiment shows an underneath sampling device 600, which may be incorporated into an air-sampling system and used with any of the air-sampling heads described above.

FIG. 9 shows, schematically, first and second conveyors 10a, 10b, which, for example, may replace the conveyor 10 of the system of the first embodiment. The conveyors are arranged adjacent another, with the downstream end of the first conveyor 10a being spaced from the upstream end of the second conveyor 10b by a narrow gap. Over the gap is located an air-sampling head, which in this case is the air-sampling head of the fourth embodiment. Located in the gap between the conveyors is an underneath-sampling device 600.

The underneath-sampling device 600 is a long, narrow, generally trapezoidal-prism shaped head. The underneath sampling device 600 comprises, in an upper surface, facing the leak detection head in use, a plurality of air-sampling ports 602, arranged in a row extending along the gap between the conveyors. Each air-sampling port 602 is connected via a respective conduit to a manifold 603 in the underneath sampling device 600. At either lateral end of the underneath sampling device 600, is a test equipment port 604, which, in use, is connected so as to be in fluid communication with an air sample tube for connecting to the test equipment and providing the vacuum suction to the underneath sampling device 600.

In use, as a container is conveyed by the first conveyor 10a beneath the air-sampling head 400 and across the gap onto the second conveyor. The air-sampling head presses on the upper surface of the container and obtains an air sample from the upper side of the container substantially as described above. The underneath-sampling device 600 simultaneously obtains an air sample from the bottom of the container as it is being pressed by the air-sampling head 400.

While the underneath-sampling device of this embodiment is separate from the leak detection head, it will be appreciated that it could alternatively be incorporated into a leak detection head, which would define a portal through which a container is conveyed in use.

A method of detecting breaches in containers, suitable for implementation using the above systems and devices, will now be described with reference to the flow diagram of FIG. 10.

A first embodiment of the method comprises the step S100 of applying a pressure to a sealed container located in an air-sampling region using a pressing member. This step acts to force air out of any breaches in the container, which improves the detectability of gases within the container. Optionally, this step may be performed while the sealed container moves relative to the pressing member.

Next, in step S200 an air sample is taken from the air-sampling region during and/or after applying the pressure to the sealed container. The air sample taken in step S200 will include at least some of the gas forced out of breaches (if any) in the container. Optionally, this sample may be taken through a porous material forming a part of the pressing member used to contact the sealed container. Further, the quality of the air sample obtained may be improved by performing this step with a step (not shown) of exhausting gas, either in the form of an air curtain, preferably surrounding the location at which the sample is taken, or in the form of gas exhausted through an area of the porous material before the air sample is taken, or both.

Next, in step S300, the air sample is communicated to air-sample testing equipment. In this step, the air sample, potentially including gas forced from a breach in a container, is provided to air-sample testing equipment.

Finally, in step S400, the composition of the air sample is tested using the air-sample testing equipment to determine whether there is a breach in the sealed container. If the composition of the air sample is found to meet user defined criteria, then the container from which the sample was taken is identified as having a breach. In particular, the carbon dioxide, oxygen and/or nitrogen content of the air sample may be tested, and a breach be identified when the carbon dioxide, oxygen and/or nitrogen content of the air sample meets pre-set criteria. These criteria may include the rate of change in carbon dioxide, oxygen and/or nitrogen being greater than a threshold value.

If, in step S400, it is determined that a container has a breach, this container may be identified for disposal or repackaging. When implemented as part of a production line, a breached container may be diverted off the production line at a point downstream of the air-sampling region for reprocessing.

A seventh embodiment will now be described with reference to FIGS. 11A to 11D. This example comprises a first conveyor belt 701, which acts as a pressing member, opposite a second conveyor belt 702. The conveyor belts are entrained about a plurality of rollers (not shown) for holding the conveyor belts in the desired arrangement and for powering the conveyor belts, as is generally known in the art. A sealed food container T is provided into the gap between the first and second conveyor belts. The sealed food container rests on the lower conveyor belt 702 and the upper conveyor belt 701 contacts the upper surface of the sealed food container T to apply a pressure to the sealed food container. In use, both conveyor belts 701, 702 rotate at the same speed such that the sealed food container moves through the system.

Within both the upper and lower conveyor belts 701, 702 are respective upper and lower air-sampling heads 711, 712. These may be constructed similarly to the underneath-sampling device 600 described above. Both air-sampling heads 711, 712 extend across the entire width of the conveyor belts and have a plurality of air sampling ports that face towards a sealed food container passing between the conveyor belts. As shown, in particular in FIG. 11B, each of the conveyor belts 701, 702 comprise an array of perforations 703 such that the conveyor belts are air permeable. In use, vacuum suction is communicated through air-sample tubes (not shown) to the air-sampling heads and the individual air-sampling ports so that the air-sampling ports each draw air into them. The air-sampling heads 711, 712 are thereby able to sample air proximate the sealed food container T passing between the conveyor belts, i.e. in the air-sampling region. In use, any gas forced through breaches in the sealed food container by the sandwiching action of the upper and lower conveyors 701, 702 will be sampled by the air-sampling heads 711, 712 and communicated to testing means, described above, for detection of the breach.

The invention claimed is:

1. A leak detection system for detecting breaches in sealed food containers, the leak detection system comprising:
   a conveyor for conveying the sealed food container through the leak detection system along a conveyance direction;
   air-sample testing equipment configured to test the composition of an air sample provided to the air-sample testing equipment;
   a leak detection head arranged over the conveyor;
   at least two pressing members located on the leak detection head and being spaced from one another along the conveyance direction of the conveyor, wherein each pressing member comprises a rotatable roller or wheel, and wherein the at least two pressing members are configured to, in use, apply pressure to the sealed food container located in an air-sampling region;
   a plurality of air-sampling ports located on the leak detection head in the air-sampling region between the at least two pressing members;
   an air sample conduit extending between the plurality of air sampling ports and the air-sample testing equipment;
   wherein, in use, the plurality of air-sampling ports take an air sample from the air-sampling region at least during or after the at least two pressing members apply pressure to the sealed food container in the air-sampling region and communicates said air sample through the air sample conduit to the air-sample testing equipment.

2. A leak detection system according to claim 1, wherein each pressing member is configured to apply pressure to the sealed food container while the sealed food container moves relative to the pressing member.

3. A leak detection system according to claim 1, further comprising at least one gas-output port, communicatively coupled to a gas source, and configured to exhaust gas at least one of before or while the at least one air-sampling port takes the air sample from the air-sampling region.

4. A leak detection system according to claim 3, wherein the at least one gas-output port is located on or in each pressing member.

5. A leak detection system according to claim 1, further comprising a second plurality of air-sampling ports, wherein the pressing member is located between a first subset of the second plurality of air-sampling ports and a second subset of the second plurality of air-sampling ports.

6. A leak detection system according to claim 1 further comprising at least one additional air-sampling port located on or in one or more of the at least two pressing members.

7. A leak detection system according to claim 1, wherein each pressing member comprises a porous material configured to contact the sealed food container.

8. A leak detection system according to claim 7, further comprising at least one additional air-sampling port located on or in one or more of the at least two pressing members, wherein the porous material covers the at least one additional air-sampling port.

9. A leak detection system according to claim 7, further comprising at least one gas-output port configured to exhaust gas into the porous material.

10. A leak detection system according to claim 7, wherein the porous material at least partially covers the surface of each rotatable roller or wheel.

11. A leak detection system according to claim 7, further comprising at least one gas-output port, communicatively coupled to a gas source, the at least one gas-output port being configured to exhaust gas into an area of the porous material before said area of the porous material contacts the sealed food container.

12. A leak detection system according to claim 1, further comprising a fixed shaft on which at least one of the rotatable roller or wheel is mounted, and further comprising at least one air-sampling port and at least one gas-output port mounted on the fixed shaft of the at least one rotatable roller and/or wheel, said one of the at least one rotatable roller or wheel rotating about the fixed shaft.

13. A leak detection system according to claim 12, further comprising a third subset of air-sampling ports to take an air sample from a third side of the sealed food container, and a fourth plurality of air-sampling ports to take an air sample from a fourth side of the sealed food container.

14. A leak detection system according to claim 1, further comprising a second plurality of air sampling ports, wherein the first plurality of air-sampling ports take an air sample from a first side of a sealed food container and the second plurality of air-sampling ports take an air sample from a second side of the sealed food container.

15. A method of detecting breaches in sealed containers comprising:
   applying a pressure to a sealed container located in an air-sampling region using at least two pressing members located on a leak detection head and spaced from one another along a conveyance direction of a conveyor that conveys the sealed food container past the leak detection head, wherein each pressing member comprises a rotatable roller or wheel;
   taking an air sample from the air-sampling region during and/or after applying the pressure to the sealed container, wherein the air sample is taken using a plurality of air-sampling ports located on the leak detection head in the air-sampling region between the at least two pressing members;
   communicating the air sample to air-sample testing equipment;
   testing the composition of the air sample using the air-sample testing equipment to determine whether there is a breach in the sealed container.

* * * * *